US012662315B2

(12) United States Patent　　　　　(10) Patent No.:　US 12,662,315 B2

Iwasa et al.　　　　　　　　　　　　　(45) Date of Patent:　　　Jun. 23, 2026

(54) CONTROL METHOD, STORAGE MEDIUM AND INFORMATION PROCESSING DEVICE

(71) Applicant: HONDA MOTOR CO., LTD., Tokyo (JP)

(72) Inventors: Takashi Iwasa, Saitama (JP); Takahito Fujita, Saitama (JP); Yuichi Futamura, Saitama (JP); Takao Sato, Saitama (JP); Shinya Agatsuma, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 174 days.

(21) Appl. No.: 18/476,312

(22) Filed: Sep. 28, 2023

(65) Prior Publication Data

US 2024/0025644 A1　　　Jan. 25, 2024

Related U.S. Application Data

(63) Continuation of application No. PCT/JP2022/016552, filed on Mar. 31, 2022.

(30) Foreign Application Priority Data

Mar. 31, 2021　　(JP) ................................. 2021-060785

(51) Int. Cl.
　　*B65G 1/137*　　　　(2006.01)
　　*B60L 53/80*　　　　(2019.01)
　　　　　　(Continued)

(52) U.S. Cl.
　　CPC ......... *B65G 1/1371* (2013.01); *G06Q 10/087* (2013.01); *G07F 17/0014* (2013.01);
　　　　　　(Continued)

(58) Field of Classification Search
　　CPC ............... B65G 1/1371; G06Q 10/087; G06Q 10/0631; G06Q 10/0837; G06Q 30/06;
　　　　　　(Continued)

(56) References Cited

U.S. PATENT DOCUMENTS 9,738,168 B2 *　8/2017　Penilla ................ H01M 50/256
11,135,938 B2 *　10/2021　Arima ................... B60L 53/665
　　　　　　(Continued)

FOREIGN PATENT DOCUMENTS

CN　　　102064579 B　　7/2014
EP　　　　0902521 A2　　3/1999
　　　　　　(Continued)

OTHER PUBLICATIONS

International Search Report and Written Opinion (ISA/237) of the International Search Authority for International Patent Application No. PCT/JP2022/016552, mailed by the Japan Patent Office on May 31, 2022.

(Continued)

*Primary Examiner* — Michael Jared Walker

(57)　　　　　　ABSTRACT

In a control method of a stocking apparatus, the stocking apparatus includes a plurality of housings formed separately and independently. Each of the plurality of housings includes a plurality of stockers, each of which stocks an item. The control method comprises: acquiring a demand number which is a number of at least one item being the item to be received by the stocking apparatus from a utilizer of the stocking apparatus or a number of at least one item being the item to be provided by the stocking apparatus to the utilizer of the stocking apparatus; and determining a receiving-and-providing stocker which is at least at least one of the plurality of stockers of the plurality of housings and receives the item from the utilizer or provides the item to the utilizer, based on the demand number.

16 Claims, 16 Drawing Sheets

(51) Int. Cl.
| | | |
|---|---|---|
| *G06Q 10/087* | (2023.01) |
| *G07F 17/00* | (2006.01) |
| *H02J 7/50* | (2026.01) |
| *H02J 7/70* | (2026.01) |
| *H02J 9/06* | (2006.01) |

(52) U.S. Cl.
CPC ................ *H02J 7/50* (2026.01); *H02J 7/70* (2026.01); *B60L 53/80* (2019.02); *B60L 2200/12* (2013.01); *H02J 9/06* (2013.01)

(58) Field of Classification Search
CPC ... G06Q 50/40; G07F 17/0014; G07F 15/005; G07F 15/006; G07F 17/0042; H02J 7/0013; H02J 7/0042; H02J 9/06; H02J 7/0047; B60L 53/80; B60L 2200/12; B60L 53/63; B60L 53/68; B60L 2250/14
See application file for complete search history.

(56) References Cited

U.S. PATENT DOCUMENTS

| | | | |
|---|---|---|---|
| 11,447,105 B2 * | 9/2022 | Shih .................... | H01M 10/482 |
| 11,602,994 B2 * | 3/2023 | Penilla ................... | B60L 1/003 |
| 11,648,845 B2 * | 5/2023 | Ebisu ...................... | B60L 53/66 |
| | | | 320/107 |

| | | | |
|---|---|---|---|
| 2004/0267394 A1 * | 12/2004 | Kempf ................ | G06Q 10/087 |
| | | | 705/28 |
| 2010/0070342 A1 * | 3/2010 | Hu .......................... | G06Q 30/02 |
| | | | 707/769 |
| 2019/0023138 A1 * | 1/2019 | Takatsuka .............. | G06Q 50/40 |
| 2020/0006969 A1 * | 1/2020 | Penilla ................... | H04L 67/04 |
| 2020/0339005 A1 * | 10/2020 | Liao ..................... | H02J 7/0014 |
| 2020/0384879 A1 * | 12/2020 | Ebisu .................... | B60L 53/305 |
| 2022/0219564 A1 * | 7/2022 | Aoto ....................... | B60L 53/65 |
| 2024/0022085 A1 * | 1/2024 | Fujiyama .......... | H01M 10/4257 |

FOREIGN PATENT DOCUMENTS

| | | |
|---|---|---|
| JP | H11150809 A | 6/1999 |
| JP | H11167673 A | 6/1999 |
| JP | 2020182371 A | 11/2020 |
| KR | 102228640 B1 | 3/2021 |
| WO | 2017086163 A1 | 5/2017 |
| WO | 2019163573 A1 | 8/2019 |
| WO | 2020153481 A1 | 7/2020 |
| WO | WO-2021005703 A1 * | 1/2021 |

OTHER PUBLICATIONS

Examination report issued for counterpart Indian Application 202317065308, issued by the Patent Office of India on May 26, 2025.

* cited by examiner

<u>100</u>

12

POWER SYSTEM

WIRELESS
COMMUNICATION

14

140

MANAGEMENT
SERVER 128
126

NEAR FIELD
WIRELESS COM-
MUNICATION

42

40

30

DISPENSE

ATTACH

RETURN

REMOVE 122    124

| COMMAND NAME | CONTENT |
|---|---|
| CMD_POWER_OFF | FORCE BREAKER TO SHUT DOWN |
| CMD_BUZZER | SOUND BUZZER IN A SPECIFIC PATTERN |
| CMD_ENC_FAN_STOP | SWITCH ON/OFF OF TEMPERATURE REGULATOR |
| CMD_LCM_PWR_OFF | SWITCH ON/OFF OF POWER SUPPLY FOR DISPLAY BACKLIGHT |
| CMD_MAINT | SHIFT TO MAINTENANCE MODE |
| CMD_LED_PATTERN | SPECIFY DISPLAYING PATTERN OF STATE DISPLAYER INSTALLED IN INDIVIDUAL SLOT |
| CMD_SLOT_FAN | SWITCH ON/OFF OF TEMPERATURE REGULATOR INSTALLED IN INDIVIDUAL SLOT |
| CMD_MPP_START | SWITCH ON/OFF OF START SIGNAL FOR BATTERY INSERTED INTO INDIVIDUAL SLOT |
| CMD_MPP_CHARGE | SWITCH PERFORMING/STOPPING OF CHARGING BATTERY INSERTED INTO INDIVIDUAL SLOT |
| CMD_AUX_SUPPLY | SWITCH PERFORMING/STOPPING OF DISCHARGING BATTERY INSERTED INTO INDIVIDUAL SLOT |
| CMD_MPP_READ | READ RECORDED INFORMATION IN BATTERY INSERTED INTO INDIVIDUAL SLOT |
| CMD_MPP_CLEAN | DELETE RECORDED INFORMATION IN BATTERY INSERTED INTO INDIVIDUAL SLOT |
| CMD_PLUG_MOT | INSERT/REMOVE POWER CONNECTOR INTO/FROM BATTERY INSERTED INTO INDIVIDUAL SLOT |

*FIG.9*

START

DETERMINE NUMBER OF BATTERIES 20 TO BE
RETURNED BY USER 40 OR NUMBER OF BATTERIES 20
TO BE DISPENSED TO USER 40 — S1312

DETERMINE SLOT 124 TO RECEIVE BATTERY 20 OR
SLOT 124 TO DISPENSE   BATTERY — S1314

RECEIVE BATTERY 20 OR DISPENSE BATTERY 20 — S1316

END

<u>674</u>

CONTROL METHOD, STORAGE MEDIUM AND INFORMATION PROCESSING DEVICE

The contents of the following patent application(s) are incorporated herein by reference:
NO. 2021-060785 filed in JP on Mar. 31, 2021
NO. PCT/JP2022/016552 filed in WO on Mar. 31, 2022

BACKGROUND

1. Technical Field

The present invention relates to a control method, a storage medium and an information processing apparatus.

2. Related Art

Patent document 1 discloses a stocking apparatus which stocks a power storage apparatus which hands a plurality of power storage apparatuses to the utilizer of the power storage apparatus.

PRIOR ART DOCUMENT

Patent Document

Patent Document 1: International Publication No. 2020/153481.

BRIEF DESCRIPTION OF THE DRAWINGS

FIG. 1 schematically illustrates an example of a system configuration of a battery management system 100.
FIG. 9 illustrates examples of commands.

DESCRIPTION OF EXEMPLARY EMBODIMENTS

Figure 2:
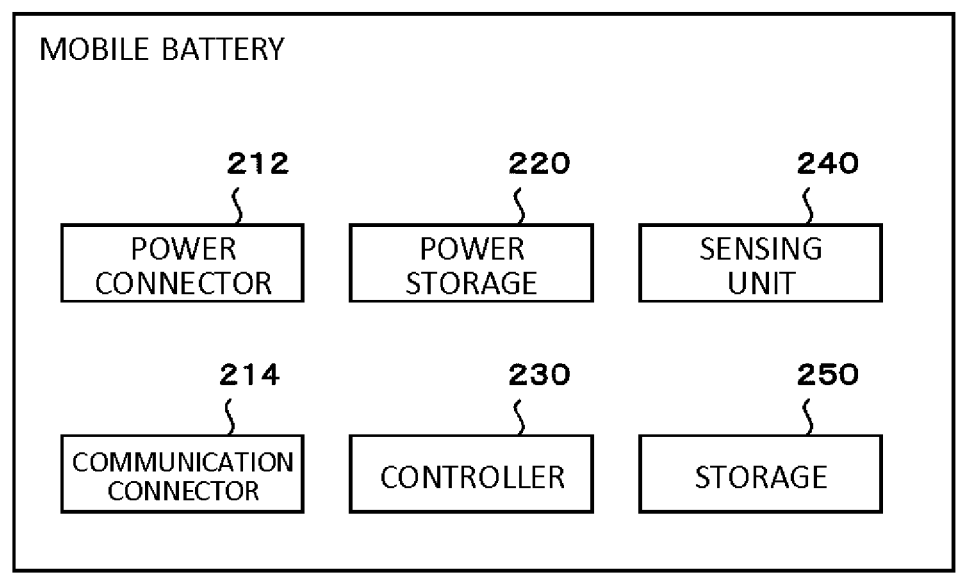
FIG. 2 schematically illustrates an example of an internal configuration of a mobile battery 20.

Hereinafter, the present invention will be described through embodiments of the invention, but the following embodiments do not limit the invention according to claims. In addition, not all of the combinations of features described in the embodiments are essential to the solution of the invention. Note that in the drawings, the same or similar parts are assigned with same reference signs, and duplicated descriptions may be omitted.

(Overview of Battery Management System 100)

FIG. 1 schematically illustrates an example of a system configuration of a battery management system 100. In the present embodiment, the battery management system 100 includes one or a plurality of (which may simply be referred to as "one or more") battery exchangers 120 and a management server 140. In the present embodiment, the battery exchanger 120 includes one or more stocking units 122 and a communication unit 126. In the present embodiment, the stocking unit 122 includes one or more slots 124. In the present embodiment, the communication unit 126 includes a communication interface 128.

In the present embodiment, each component of the battery management system 100 operates by consuming power received from a power system 12. In addition, each component of the battery management system 100 can transmit/receive information to/from each other via a communication network 14. The one or more stocking units 122 and the communication unit 126 can transmit/receive information to/from each other via a wired or wireless communication line (not depicted).

In the present embodiment, the battery management system 100 manages one or a plurality of (which may be referred to as one or more) mobile batteries 20. For the purpose of brief description, in the present embodiment, a case where the battery management system 100 provides the sharing service of the mobile battery 20 to a user 40 of an electric motorcycle 30 is used as an example to describe the detail of the battery management system 100.

In the present embodiment, each of the one or more slots 124 arranged in the stocking unit 122 of the battery exchanger 120 can stock one or more mobile batteries 20. In addition, each of the one or more slots 124 arranged in the stocking unit 122 of the battery exchanger 120 can charge the one or more mobile batteries 20.

The user 40 who subscribes the sharing service of the mobile battery 20 utilizes, for example, a communication terminal 42 to access the battery management system 100 and request the lending of the mobile battery 20. When the user 40 makes a reservation of the lending of the mobile battery, the user 40 may specify the time and place of the lending of the mobile battery 20 hoped by the user 40 and the number of mobile batteries 20 to be lent hoped by the user 20. The communication terminal 42 may access the battery management system 100 via the communication network 14 or may access the battery management system 100 via the battery exchanger 120. Note that the user 40 may manipulate the battery exchanger 120 to request the lending of the mobile battery 20.

In response to the above request being accepted, the user 40 can take out the mobile battery 20 accommodated in the battery exchanger 120 (which may be referred to as the dispense of the mobile battery 20). In this way, the user 40 can swap the mobile battery 20 attached to the electric motorcycle 30 and the mobile battery 20 accommodated in the battery exchanger 120.

To be more specific, the user 40 removes the mobile battery 20 attached to the electric motorcycle 30 from the electric motorcycle 30. The user 40 returns the mobile battery 20 removed from the electric motorcycle 30 to the battery exchanger 120. After the user 40 returns the mobile battery 20, the battery exchanger 120 dispenses the charged mobile battery 20 accommodated in the battery exchanger 120. The user 40 receives the charged mobile battery 20 from the battery exchanger 120 and attaches said charged mobile battery 20 to the electric motorcycle 30. In this way, the mobile battery 20 can be exchanged between the electric motorcycle 30 and the battery exchanger 120.

(Overview of Each Component Related to Battery Management System 100)

In the present embodiment, the communication network 14 conveys information. The communication network 14 may be a transmission path for wired communication, or may be a transmission path for wireless communication, or may be a combination of the transmission path for wireless communication and the transmission path for wired communication. The communication network 14 may include a wireless packet communication network, the Internet, a P2P network, a dedicated line, VPN, a power line communication line, or the like.

The communication network 14 may include (i) a mobile communication network such as a mobile phone line network, or may include (ii) a wireless communication network such as a wireless MAN (for example, a WiMAX (registered trademark)), a wireless LAN (for example, a WiFi (registered trademark), Bluetooth (registered trademark), a Zigbee (registered trademark), and an NFC (Near Field Communication). The wireless LAN, Bluetooth (registered trademark), Zigbee (registered trademark), and NFC may be examples of near field wireless communication.

In the present embodiment, the mobile battery 20 stores electrical energy. The mobile battery 20 may be configured to be detachable (which may be referred to as freely detachable) from the electric motorcycle 30. The mobile battery 20 may be configured to be detachable from the battery exchanger 120. Thus, the user 40 can swap the mobile battery 20 attached to the electric motorcycle 30 and the mobile battery 20 accommodated in the battery exchanger 120.

In an embodiment, the mobile battery 20 is attached to the electric motorcycle 30, and the mobile battery 20 supplies the power to the electric motorcycle 30. As described above, the mobile battery 20 can be attached to the electric motorcycle 30 in a detachable fashion. In another embodiment, the mobile battery 20 is charged by the battery exchanger 120 while being accommodated in the battery exchanger 120.

Note that the mobile battery 20 may supply the power to the battery exchanger 120 while being accommodated in the battery exchanger 120. Thus, the battery exchanger 120 can utilize some of the mobile batteries 20 accommodated in the battery exchanger 120 as uninterruptible power supply apparatuses (which may be referred to as UPS), for example.

In the present embodiment, the mobile battery 20 is mounted to the electric motorcycle A plurality of mobile batteries 20 may be mounted to the electric motorcycle 30. The electric motorcycle 30 utilizes the power stored in the mobile battery 20. For example, the electric motorcycle 30 travels by consuming the power supplied from the mobile battery 20.

In the present embodiment, the communication terminal 42 transmits/receives information to/from each component of the battery management system 100 via the communication network 14. The communication terminal 42 may function as a user interface when the user 40 accesses the battery management system 100. The communication terminal 42 may be utilized for user authentication processing performed by the battery management system 100.

Examples of the communication terminal 42 include a personal computer, a mobile terminal, and the like. Examples of the mobile terminal include a mobile phone, a smartphone, a PDA (registered trademark), a tablet, a notebook computer or a laptop computer, a wearable computer, and the like.

In the present embodiment, the battery exchanger 120 accommodates the mobile battery 20. The battery exchanger 120 may accommodate a plurality of mobile batteries 20. In this way, the battery exchanger 120 can stock one or more mobile batteries 20. In the present embodiment, the battery exchanger 120 charges at least one of the one or more mobile batteries 20. The battery exchanger 120 may charge the mobile battery 20 until the charge percentage or voltage of the mobile battery 20 becomes a predetermined setting value.

In the present embodiment, the battery exchanger 120 creates a state in which the completely charged mobile battery 20 can be taken out (which may be referred to as dispensed). In response to a request from the user 40, the battery exchanger 120 may dispense the mobile battery 20 that meets said request. The battery exchanger 120 may acquire, from the management server 140, information representing a dispense condition which is a condition related to the mobile battery 20 to be dispensed and determine the mobile battery 20 to be actually dispensed among the mobile batteries 20 that meets said dispense condition.

Note that, in another embodiment, the battery exchanger 120 may discharge at least some of the plurality of mobile batteries 20. The battery exchanger 120 may utilize the power output through the discharge of the mobile battery 20. For example, the battery exchanger 120 operates by consuming the power output through the discharge of the mobile battery 20. When the battery exchanger 120 operates by consuming the power output through the discharge of one mobile battery 20, the battery exchanger 120 may stop or suspend the operation of charging other mobile batteries 20. Even in such a case, the battery exchanger 120 may continue the operation of dispensing the mobile battery 20.

In this way, the battery exchanger 120 can utilize some of the mobile batteries 20 accommodated in the battery exchanger 120 as uninterruptible power supply apparatuses. According to the battery exchanger 120 according to the present embodiment, for example, even when there is something abnormal with the power supply from the power system 12 to the battery exchanger 120, the power supply to a control apparatus mounted to the battery exchanger 120 can be continued. As a result, the battery exchanger 120 can continue to dispense the mobile battery 20, for example. Accordingly, for example, even if the battery exchanger 120 is installed in a region where the occurrence frequency of power outages is relatively high, a stable environment where batteries can be swapped can be provided.

In the present embodiment, the stocking unit 122 holds a plurality of slots 124. In the present embodiment, the stocking unit 122 is formed separately and independently from the communication unit 126. The stocking unit 122 may be installed to be separated from the communication unit 126, or may be installed to abut on the communication unit 126.

In addition, in the present embodiment, the stocking unit 122 forms the flow of the processing including one or more processes for controlling the operation of at least one of the plurality of slots 124, in accordance with the first order transmitted by the communication unit 126. The stocking unit 122 determines whether each of the one or more processes can be executed. For the process determined as a process that can be executed, the stocking unit 122 generates the second order to control the target slot 124 of said process. The stocking unit 122 controls the operation of the above slot 124 in accordance with the generated second order. In this way, the execution of some of the instructions represented by the first order can be restricted.

For example, when the above one or more processes includes an operation concerning the safety of the mobile battery 20, or the safety of the user 40 or the maintenance personnel of the battery exchanger 120, the stocking unit 122 determines whether the condition to permit the execution of the operation concerning said safety is satisfied. If it is determined that the above condition is satisfied, the stocking unit 122 determines that said process can be executed. In this way, the operation of the slot 124 is controlled in accordance with the second order related to the above process. On the other hand, if it is determined that the above condition is not satisfied, the stocking unit 122 determines that said process cannot be executed. In this case, the second order related the above process is not transmitted to the slot 124.

In this way, even when the communication unit 126 outputs the first order based on the request from the management server 140, the safety of the mobile battery 20, user 40, or the above maintenance personnel can be ensured. For example, even when the state of the battery exchanger 120 is changed after the management server 140 transmits the above request, if the communication environment of the battery exchanger 120 is fine, the management server 140 can cancel the above request. However, if the communication environment of the battery exchanger 120 is not fine, it is possible that it takes time for the management server 140 to cancel the above request. According to the present embodiment, the stocking unit 122 judges whether the second order can be executed depending on the state of the battery exchanger 120, so that the battery exchanger 120 does not need to wait for the cancel request from the management server 140, to discontinue or suspend the execution of part of the processing.

In the present embodiment, each of the plurality of slots 124 stocks one or more mobile batteries 20. Each of the plurality of slots 124 further includes electrical terminal (not depicted) that are electrically connected to the electrical terminals (not depicted) of one or more mobile batteries 20. Thus, each of the plurality of slots 124 can charge and/or discharge the mobile battery 20 stocked by each slot.

Note that "electrically connected" is not limited to the physical direct connection between two elements. The third element may exist between the above two elements. In addition, it is not limited to the physical connection between the above two elements. For example, input winding and output winding in a transformer are not physically connected but are electrically connected. Thus, in addition to the wired charge/discharge of the mobile battery 20, the wireless charge/discharge of the mobile battery 20 can be supported in the slot 124. Each of the plurality of slots 124 may include a communication terminal communicatively connected to the communication terminals of one or more mobile batteries 20. The communication scheme of the connection between the communication terminal of the slot 124 and the communication terminal of the mobile battery 20 may be wired communication, or may be wireless communication. Thus, each of the plurality of slots 124 can read information from the storage apparatus (not depicted) of the mobile battery 20 stocked by each slot and/or write information on said storage apparatus.

In the present embodiment, the communication unit 126 is responsible for the information processing related to at least one of the user 40 or the management server 140, among information processing in the battery exchanger 120. For example, the communication unit 126 receives a request from at least one of the user 40 or the management server 140 and responds to said request. When the communication unit 126 judges that processing the request from the at least one of the user 40 or the management server 140 requires the stocking unit 122, the communication unit 126 transmits an order (which may be referred to as command) to the stocking unit 122. The above first order may be an example of the order.

When the communication unit 126 does not need to cooperate with the stocking unit 122 to process the request from at least one of the user 40 or the management server 140, the communication unit 126 does not need to transmit an order to the stocking unit 122. Thus, the information processing in the stocking unit 122 can be simplified. The communication unit 126 does not need to cooperate with the stocking unit 122, for example, to perform communication control processing with the outside of the battery exchanger 120, authentication processing of the user 40, choosing processing of the slot 124, or the like.

As described above, in the present embodiment, the communication unit 126 is formed separately and independently from the stocking unit 122. The stocking unit 122 may be installed to be separated from the communication unit 126, or may be installed to abut on the communication unit 126.

The communication interface 128 is configured to be able to communicate with an information processing apparatus outside the battery exchanger 120. The communication interface 128 may be enabled with a plurality of communication schemes. The communication interface 128 may be enabled with a wired communication scheme, and may be enabled with a wireless communication scheme. In an embodiment, the communication interface 128 transmits/receives information to/from the communication terminal 42 utilized by the user 40. In another embodiment, the communication interface 128 transmits/receives information to/from the management server 140.

In the present embodiment, the management server 140 is arranged outside the battery exchanger 120. In addition, the management server 140 can transmit/receive information to/from the communication unit 126 of the battery exchanger 120 via the communication network 14.

In the present embodiment, the management server 140 manages one or more mobile batteries 20. For example, the management server 140 manages the state of each of the one or more mobile batteries 20. The management server 140 may manage the returning and dispensing of each of the one or more mobile batteries 20. The management server 140 may transmit various requests for managing the mobile battery 20 to at least one of the one or more battery exchangers 120.

The management server 140 may manage one or more battery exchangers 120. The management server 140 may manage the state of each of the one or more battery exchangers 120. Examples of the state of the battery exchanger 120 include the supply state of the external power, the number of the mobile batteries 20 that can be accepted, the number of mobile batteries 20 that can be dispensed, the presence or absence, number, or identification information of the mobile batteries 20 that can be utilized as uninterruptible power supply apparatuses, the charging state of the above mobile batteries 20, and the like. The management server 140 may transmit various requests for managing the battery exchanger 120 to at least one of the one or more battery exchangers 120.

The management server 140 may determine a dispense condition which is the condition related the mobile battery 20 to be dispensed, for at least some of the one or more battery exchanger 120. Examples of the dispense condition include the priority related to the dispense of each of the plurality of mobile batteries 20 accommodated in the battery exchanger 120, the identification information of the mobile battery 20 to be dispensed with a higher priority, the feature of the mobile battery 20 to be dispensed with a higher priority, and the like.

(Specific Configuration of Each Component of Battery Management System 100)

Each component of the battery management system 100 may be implemented by hardware, may be implemented by software, or may be implemented by hardware and software. At least part of each component of the battery management system 100 may be implemented by a single server, or may be implemented by a plurality of servers. At least part of each component of the battery management system 100 may be implemented on a virtual server or a cloud system. At least part of each component of the battery management system 100 may be implemented by a personal computer or a mobile terminal. Examples of the mobile terminal may include a mobile phone, a smartphone, a PDA, a tablet, a notebook computer or a laptop computer, a wearable computer, and the like. Each component of the battery management system 100 may store information by utilizing a distributed ledger technology such as a blockchain or a distributed network.

When at least some of the constitutional elements of the battery management system 100 are implemented by software, said constitutional elements implemented by software may be implemented by running a program defining operations related to said constitutional elements in an information processing apparatus having a common configuration. The above information processing apparatus having a common configuration may include (i) a data processing apparatus having a processor such as a CPU or a GPU, a ROM, a RAM, a communication interface, and the like, (ii) an input apparatus such as a keyboard, a pointing device, a touch panel, a camera, an audio input apparatus, a gesture input apparatus, various sensors, and a GPS receiver, (iii) an output apparatus such as a display apparatus, an audio output apparatus, and a vibration apparatus, and (iv) a storage apparatus (including an external storage apparatus) such as a memory, an HDD, an SSD, and the like.

In the above information processing apparatus having a common configuration, the above data processing apparatus or storage apparatus may store the above program. The above program is executed by the processor to cause the above information processing apparatus to execute operations defined by said program. The above program may be stored in a non-transitory computer-readable storage medium. The above program may be stored in a computer-readable medium such as a CD-ROM, a DVD-ROM, a memory, and a hard disk, or may be stored in a storage apparatus connected to a network.

The above program may be a program for causing a computer to function as the battery management system 100 or part of the battery management system 100. The above program may include a module defining operations of each component of the battery management system 100. Such a program or module influences the data processing apparatus, the input apparatus, the output apparatus, the storage apparatus, or the like, to cause the computer to function as each component of the battery management system 100 and/or cause the computer to implement the information processing method performed in each component of the battery management system 100.

The above program may be installed from the computer-readable medium or the storage apparatus connected to a network to a computer constituting at least part of the battery management system 100. Executing the above program may allow the computer to function as at least part of each components of the battery management system 100. The above program is read by the computer, which allows the information processing written in said program to function as a specific means in which software related to said program and the battery management system 100 or various hardware resources as parts of the battery management system 100 cooperate. Then, the above specific means implements computing or processing information in accordance with an intended use of the computer according to the present embodiment, which allows the battery management system 100 to be constructed in accordance with said intended use.

The above program may be a program for causing the computer to function as the battery exchanger 120, the management server 140 or part of them. The above program may be a program for causing the computer to implement the information processing method performed in the battery exchanger 120, the management server 140, or part of them. The above program may be stored in a computer readable medium. The above computer readable medium may be a non-transitory computer-readable storage medium.

The above information processing method may be a control method of a stocking apparatus. The above stocking apparatus includes a plurality of first housings formed separately and independently, for example. Each of the plurality of first housings includes a plurality of stockers, each of which stocks an item, for example. The above control method includes, for example, acquiring a demand number which is a number of the items to be received by the stocking apparatus from the utilizer of the stocking apparatus or a number of the items to be provided or released (which may simply be referred to as provided) by the stocking apparatus to the utilizer of the stocking apparatus. For example, the above control method includes determining a receiving-and-providing stocker which is at least one of the plurality of stockers of the plurality of first housings and receives the item from the utilizer or provides or releases the item to the utilizer, based on the demand number.

The mobile battery 20 may be an example of the power storage apparatus or the item. The user 40 may be an example of the utilizer. The battery management system 100 may be an example of the stocking apparatus or the control apparatus. The battery exchanger 120 may be an example of the stocking apparatus or the control apparatus. The stocking unit 122 may be an example of the first housing or the housing. The slot 124 may be an example of the stocker or the receiving-and-providing stocker. The communication unit 126 may be an example of the second housing or the housing for control. The dispense condition may be an example of the first basis or the second basis. The control apparatus may be an example of the information processing apparatus that processes information for controlling the stocking apparatus.

Example of Another Embodiment

In the present embodiment, a case where the battery management system 100 provides the sharing service of the mobile battery 20 is used as an example to describe the detail of the battery management system 100. However, the service provided by the battery management system 100 is not limited to the present embodiment. In another embodiment, the battery management system 100 may provide the charging service of the mobile battery 20 to the user 40 of the mobile battery 20.

In the present embodiment, a case where the battery exchanger 120 operates by utilizing the power received from the power system 12 is used as an example to describe the detail of the battery exchanger 120. However, the battery exchanger 120 is not limited to the present embodiment. In another embodiment, for example, if at least one of the one or more slots 124 arranged in the battery exchanger 120 includes a bidirectional DC-DC converter, the battery exchanger 120 may operate by utilizing the power discharged by at least one of the one or more mobile batteries 20 stocked by the battery exchanger 120.

In the present embodiment, a case where the battery exchanger 120 includes one or more stocking units 122 and a single communication unit 126 is used as an example to describe the detail of the battery management system 100. However, the battery exchanger 120 is not limited to the present embodiment. In another embodiment, the battery exchanger 120 may include a plurality of stocking units 122 and a plurality of communication units 126. In this case, the number of the stocking units 122 may be greater than the number of the communication units 126.

In the present embodiment, a case where the slot 124 arranged in the battery exchanger 120 of the battery management system 100 stocks the mobile battery 20, which is an example of the item, is used as an example to describe the detail of the battery management system 100 and the battery exchanger 120, each of which is an example of the stocking apparatus. However, the stocking apparatus is not limited to the present embodiment. A stocking apparatus is only required to be something that is configured to be able to stock an arbitrary item, and other examples of the stocking apparatus include a locker a shoe box, a parking area, a bicycle parking area, a hardstand, and the like.

In the present embodiment, a case where the user 40 who is a natural person utilizes the battery management system 100 is used as an example to describe an example of the utilizer of the battery management system 100. However, the utilizer of the battery management system 100 is not limited to a natural person. The above utilizer may be an organism other than a human being, or may be an autonomous mobile machine (which may be referred to as a robot). The autonomous mobile machine may be a vehicle which travels autonomously, may be a flight vehicle that flies autonomously, may be a marine vessel that travels autonomously, or may be a piece of machine in a human form or an animal form that walks.

FIG. 2 schematically illustrates an example of the internal configuration of the mobile battery 20. In the present embodiment, the mobile battery 20 includes a power connector 212, a communication connector 214, a power storage 220, and a controller 230, a sensing unit 240, and a storage 250.

In the present embodiment, the power connector 212 includes an electrical terminal for transmitting/receiving power to/from the slot 124 or the electric motorcycle 30. The power connector 212 may be a female connector, or may be a male connector. In the present embodiment, the communication connector 214 includes a communication terminal for transmitting/receiving information to/from the slot 124 or the electric motorcycle 30. In the present embodiment, the power storage 220 includes a power storage cell which stores power.

In the present embodiment, the controller 230 controls the operation of the mobile battery 20. The controller 230 may transmit/receive information to/from the stocking unit 122 when the slot 124 stocks the mobile battery 20.

In the present embodiment, the sensing unit 240 acquires information representing the state of the mobile battery 20. The sensing unit 240 may include a plurality of types of sensors. Examples of the sensor included in the sensing unit 240 include a temperature sensor, a voltage sensor, a current sensor, and the like.

The storage 250 stores various pieces of information concerning the mobile battery 20. For example, the storage 250 stores the identification information of the mobile battery 20. The storage 250 may store the identification information of the electric motorcycle 30, the battery exchanger 120, or the slot 124, which is electrically connected to the mobile battery 20. The storage 250 may store the operation history of the mobile battery 20. For example, the storage 250 stores the time and the measurement result of the sensing unit 240 in association with each other, as the operation history of the mobile battery 20.

The power connector 212 may be an example of the first terminal. The time may be an example of the point in time.

Figure 3:
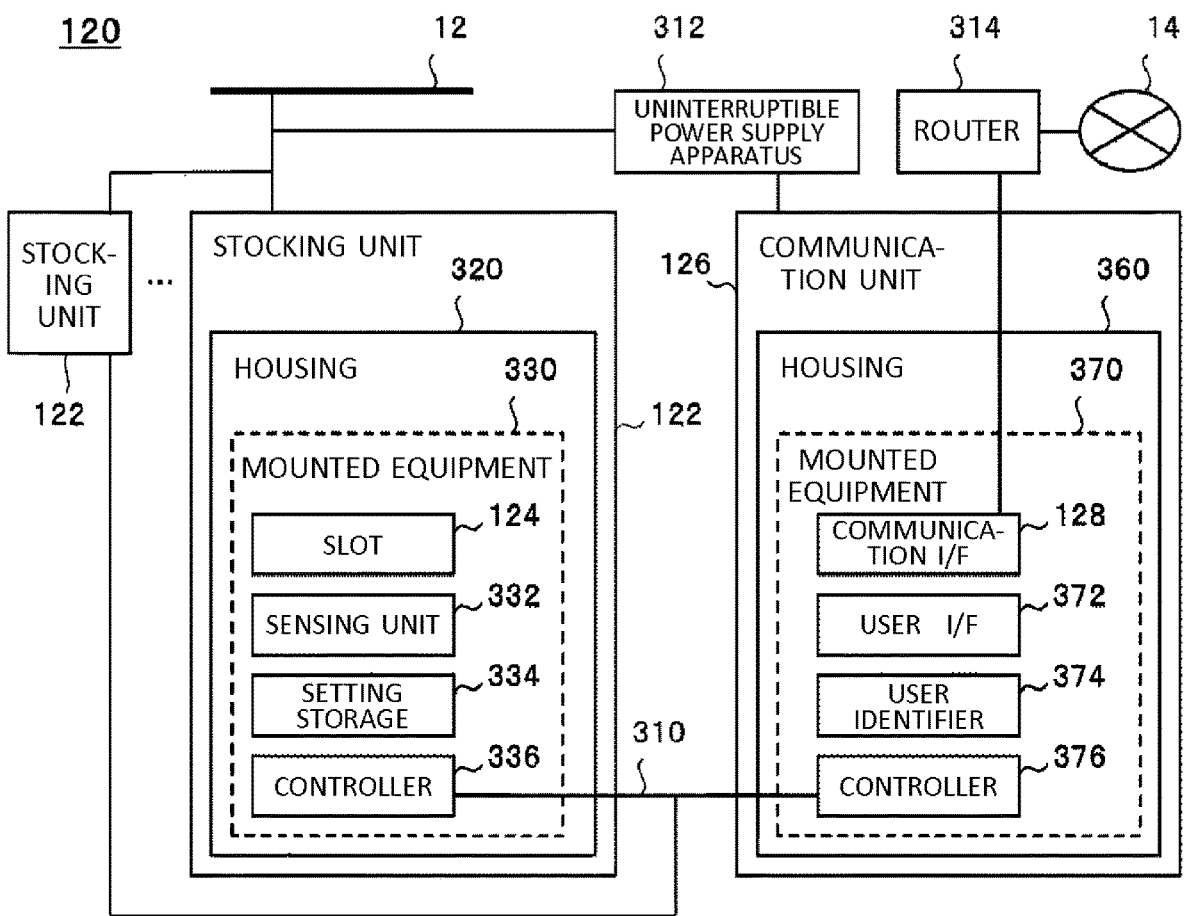
FIG. 3 schematically illustrates an example of an internal configuration of a battery exchanger 120.

FIG. 3 schematically illustrates an example of the internal configuration of the battery exchanger 120. In the present embodiment, the battery exchanger 120 includes the one or more stocking units 122, the communication unit 126, a communication line 310, an uninterruptible power supply apparatus 312, and a router 314. In the present embodiment, each of the one or more stocking units 122 includes a housing 320 and mounted equipment 330. In the present embodiment, the mounted equipment 330 includes one or more slots 124, a sensing unit 332, a setting storage 334, and a controller 336. In the present embodiment, the communication unit 126 includes a housing 360 and mounted equipment 370. In the present embodiment, the mounted equipment 370 includes a communication interface 128, a user interface 372, a user identifier 374, and a controller 376.

In the present embodiment, the communication line 310 connects each of the one or more stocking units 122 and the communication unit 126 to each other. In the present embodiment, the uninterruptible power supply apparatus 312 is arranged between a power system 12 and the communication unit 126. The uninterruptible power supply apparatus 312, for example, supplies power to the communication unit 126 when there is something abnormal with the power supply from the power system 12. In the present embodiment, the router 314 relays and/or forwards the communication between the communication unit 126 and the communication network 14.

In the present embodiment, the housing 320 holds the mounted equipment 330. The shape and material of the housing 320 are not particularly limited. The housing 320 may have a box shape, may have a plate-like shape, or may have a frame-like shape.

In the present embodiment, the mounted equipment 330 is mounted to the housing 320. The manner of mounting the mounted equipment 330 is not particularly limited. The mounted equipment 330 may be accommodated inside the housing 320, or may be implemented on the surface of the housing 320.

In the present embodiment, the sensing unit 332 acquires information representing the state of the slot 124 or the mobile battery 20 stocked by the slot 124. The sensing unit 332 may include a plurality of types of sensors. Examples of the sensor included in the sensing unit 240 include a temperature sensor, a voltage sensor, a current sensor, and the like.

In the present embodiment, the setting storage 334 stores various settings related to the stocking unit 122. The setting storage 334 may include a physical switch, or may include any types of storage medium such as a memory and a hard disk. The above settings (i) may be indicated by the ON/OFF of a physical switch, or (ii) may be stored in a storage medium as electronic data. Examples of the above setting include the setting related to the ID of the stocking unit 122, the setting related to the installing position of the stocking unit 122, the setting related to whether various operations performed in the stocking unit 122 can be executed, and the like.

In the present embodiment, the controller 336 controls the operation of the stocking unit 122. Examples of the above operation include the attachment or detachment of the mobile battery 20 to or from the slot 124, the charge or discharge of the mobile battery 20, and the like.

In an embodiment, the controller 336 controls the attachment or detachment of the mobile battery 20 to or from the slot 124. Examples of the above control include the locking control of a shutter (not depicted) arranged in the slot 124, the control of a withdrawal prevention member (not depicted) arranged in a slot 124, the control of a mechanism (not depicted) to restrain the mobile battery 20 arranged in the slot 124, the control of a movable connector (not depicted) arranged in the slot 124, and the like. The movable connector may be a mechanical connector, or may be an electric connector.

In another embodiment, the controller 336 controls the charge or discharge of the mobile battery 20 stocked by the slot 124. Examples of the above control include the connection confirmation of the electrical terminal, the adjustment of the charging voltage, the adjustment of the charging current, the adjustment of the discharge voltage, the adjustment of the discharge current, and the like. In this way, the charge or discharge of the mobile battery 20 via the electrical terminal can be controlled.

The controller 336 may control the operation of the stocking unit 122 based on the order received from the controller 376. The controller 336 forms the flow of the processing including one or more processes for controlling the operation of at least one of the plurality of slots 124, in accordance with the order received from the controller 376, for example. The controller 336 determines whether each of the one or more processes can be executed. The controller 336 generates an order related the process determined as a process that can be executed, and transmits said order to the slot 124 as to be the control target. On the other hand, for the process determined as a process that cannot be executed, the above order is not generated and not transmit.

The controller 336 may transmit information representing the execution result of the operation according to the order received from the controller 376 to the controller 376. For example, the controller 336 transmits information representing whether the operation has been executed in accordance with the order received from the controller 376 by the stocking unit 122, to the controller 376. The detail of the controller 336 will be described later.

In the present embodiment, the housing 360 holds the mounted equipment 370. The shape and material of the housing 360 are not particularly limited. The housing 360 may have a box shape, may have a plate-like shape, or may have a frame-like shape.

In the present embodiment, the mounted equipment 370 is mounted to the housing 360. The manner of mounting the mounted equipment 370 is not particularly limited. The mounted equipment 370 may be accommodated inside the housing 360, or may be mounted on the surface of the housing 360.

In the present embodiment, the user interface 372 provides various pieces of information to the user 40 who utilizes the battery exchanger 120. In addition, the user interface 372 accepts an input from the user 40 who utilizes the battery exchanger 120. Examples of the user interface 372 include a display, a speaker, a keyboard, a pointing device, a touch panel, a microphone, a camera, an audio input system, a gesture input system, and the like.

In the present embodiment, the user identifier 374 identifies the user 40 who utilizes the battery exchanger 120. A known approach can be employed as the approach to identify the user 40. For example, the user identifier 374 identifies the user 40 by executing the authentication processing of the user 40 by analyzing the image of the user 40. The user identifier 374 may identify the user 40 by executing the authentication processing of the user 40 by utilizing the ID card carried by the user 40. The user identifier 374 may identify the user 40 by executing the authentication processing of the user 40 by utilizing the communication terminal 42 carried by the user 40.

In the present embodiment, the controller 376 is responsible for the information processing involving at least one of the user 40 or the management server 140, among information processing in the battery exchanger 120. For example, the controller 376 receives a request from at least one of the user 40 or the management server 140 and responds to said request. If the controller 376 judges that processing the request from the at least one of the user 40 or the management server 140 requires the stocking unit 122, the controller 376 transmits an order (for example, the above first order) to the stocking unit 122.

If the controller 376 does not need to cooperate with the stocking unit 122 to process the request from at least one of the user 40 or the management server 140, the controller 376 does not need to transmit an order to the stocking unit 122. For example, the controller 376 does not need to cooperate with the stocking unit 122 to perform communication control processing with the outside of the battery exchanger 120, authentication processing of the user 40, choosing processing of the slot 124, or the like.

To be more specific, in response to the controller 376 accepting a request from at least one of the user 40 or the management server 140, the controller 376 first forms the flow of the processing including one or more processes for processing said request. Then, the controller 376 extracts processes including processing performed in the stocking unit 122 among the above one or more processes. The controller 376 generates an order representing the content of the processing performed in the stocking unit 122, for each of the extracted processes.

The above order may include information representing the stocking unit 122 to be the control target (which may be referred to as target unit). The above order may include information representing the slot 124 to be the control target (which may be referred to as target slot). The above order may include the identification information of the target slot and information representing the content of the operation performed in the target slot.

Then, the controller 376 transmits the above order to the stocking unit 122 to be the target of the order. The controller 376 may acquire information representing the execution result of the above order from the stocking unit 122 having received the above order. The detail of the controller 376 will be described later.

The housing 320 may be an example of the first housing or the housing. The housing 360 may be an example of the second housing or the housing for control.

Figure 4:
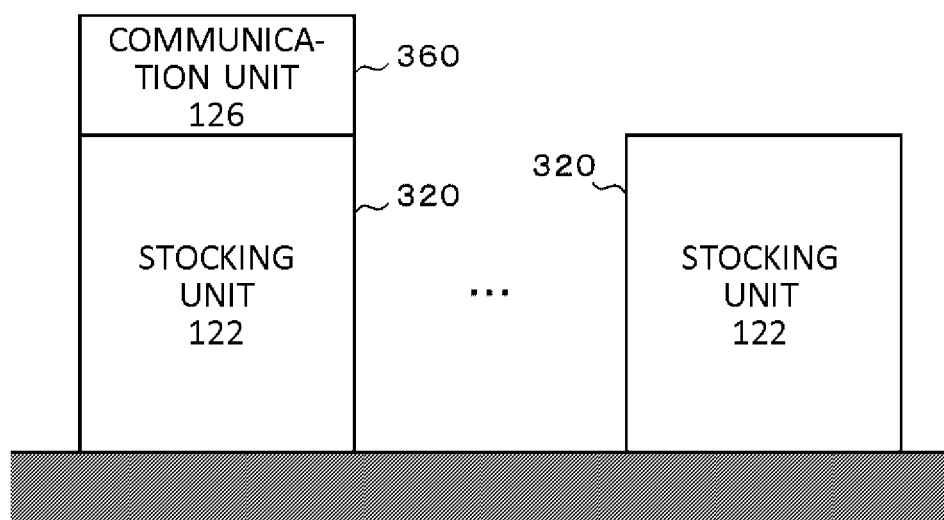
FIG. 4 schematically illustrates another example of the system configuration of the battery exchanger 120.

FIG. 4 schematically illustrates another example of the system configuration of the battery exchanger 120. In the present embodiment, the communication unit 126 is arranged to abut on one of the one or more stocking units 122. According to the present embodiment, the battery exchanger 120 is different from that described in connection with FIG. 1 in that part of the housing 360 of the communication unit 126 and part of the housing 320 of the stocking unit 122 are in contact.

Figure 5:
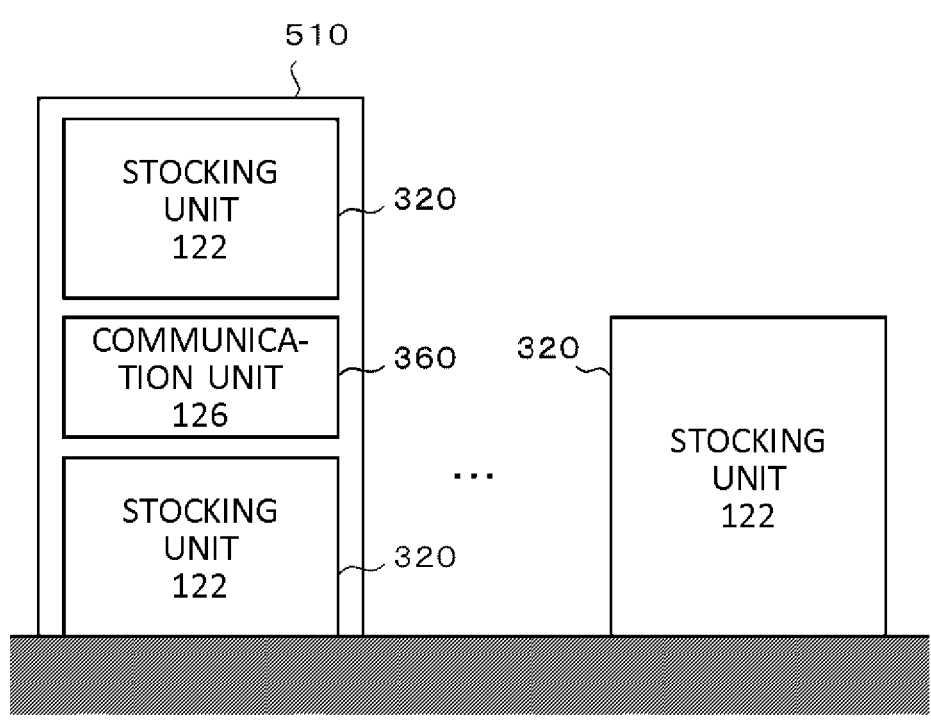
FIG. 5 schematically illustrates another example of the system configuration of the battery exchanger 120.

FIG. 5 schematically illustrates another example of the system configuration of the battery exchanger 120. In the present embodiment, a single holding member 510 holds the communication unit 126 and the stocking unit 122. In the present embodiment, the communication unit 126 is arranged between two stocking units 122. The shape of the holding member 510 may have a box shape, or may have a plate-like shape. According to the present embodiment, the battery exchanger 120 is different from that described in connection with FIG. 1 in that the stocking unit 122 and the communication unit 126 formed separately and independently appear to be integrally configured at first sight.

Figure 6:
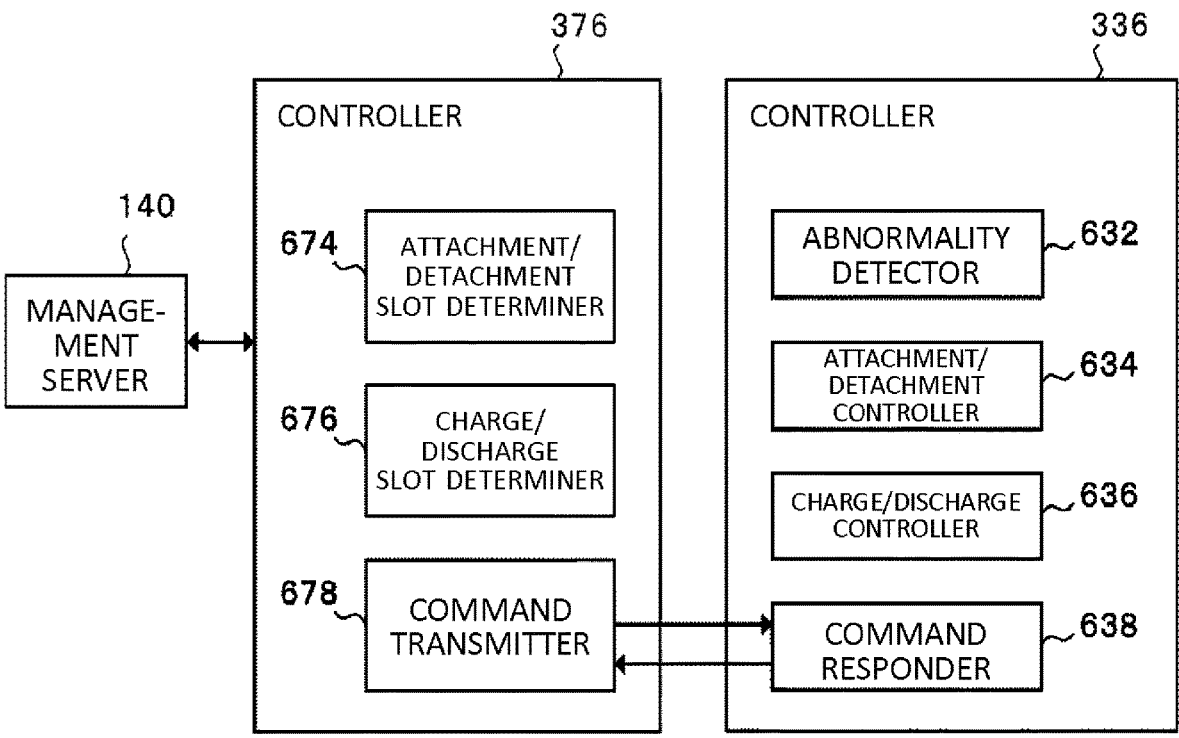
FIG. 6 schematically illustrates an example of an internal configuration of a controller 336 and a controller 376.

FIG. 6 schematically illustrates an example of the internal configuration of the controller 336 and the controller 376. In the present embodiment, the controller 336 includes an abnormality detector 632, an attachment/detachment controller 634, a charge/discharge controller 636, and a command responder 638. In the present embodiment, the controller 376 includes an attachment/detachment slot determiner 674, a charge/discharge slot determiner 676, and a command transmitter 678. In the present embodiment, in accordance with the flow of the information processing performed in the battery exchanger 120, details of each component of the controller 376 will be described first, and then details of each component of the controller 336 will be described.

In the present embodiment, the attachment/detachment slot determiner 674 determines the slot 124 to or from which the mobile battery 20 is attached or detached among the plurality of slots 124. The attachment/detachment slot determiner 674 may determine the slot 124 to or from which the mobile battery 20 is attached or detached based on the request or instruction from the management server 140.

In the present embodiment, the charge/discharge slot determiner 676 determines the slot 124 to charge or discharge the mobile battery 20 among the plurality of slots 124. The charge/discharge slot determiner 676 may determine the slot 124 to charge or discharge the mobile battery 20 based on the request or instruction from the management server 140.

In the present embodiment, the command transmitter 678 transmits an order for controlling the operation of the stocking unit 122 to the controller 336 of the stocking unit 122 to be the control target. The command transmitter 678 may transmit an order including information representing the slot 124 to be the control target (which may be referred to as target slot) to the controller 336 of the stocking unit 122 to be the control target.

In an embodiment, the command transmitter 678 transmits the slot 124 determined as the target slot by the attachment/detachment slot determiner 674 to the above controller 336. In another embodiment, the command transmitter 678 transmits the slot 124 determined as the target slot by the charge/discharge slot determiner 676 to the above controller 336.

In the present embodiment, the abnormality detector 632 acquires, for example, the abnormality of the slot 124 or the mobile battery 20 stocked by the slot 124. For example, the abnormality detector 632 acquires the above abnormality based on the state acquired by the sensing unit 240 and the sensing unit 332.

Examples of the above abnormality include at least one of that the temperature of the slot 124 is out of a normal range or that the temperature of the mobile battery 20 stocked by the slot 124 is out of a normal range. Other examples of the above abnormality include that contamination of a foreign object in the slot 124 is detected, that the opening of the shutter of the slot 124 is detected, that the opening of the door arranged in the housing 320 is detected, driving the movable connector arranged in the slot 124 is prohibited due to the door arranged in the housing 320 being opened, and the like.

In the present embodiment, the attachment/detachment controller 634 controls the attachment or detachment of the mobile battery 20 to/from the slot 124. Examples of the above control include the locking control of a shutter arranged in the slot 124, the control of a withdrawal prevention member arranged in a slot 124, the control of a mechanism (not depicted) to restrain the mobile battery 20 arranged in the slot 124, the control of a movable connector arranged in the slot 124, and the like.

In the present embodiment, the charge/discharge controller 636 controls the charge or discharge of the mobile battery 20 stocked by the slot 124. Examples of the above control include the connection confirmation of electrical terminals, the adjustment of the charging voltage, the adjustment of the charging current, the adjustment of the discharge voltage, the adjustment of the discharge current, and the like.

In the present embodiment, the command responder 638 receives the order transmitted by the command transmitter 678. The command responder 638 controls the operation of the stocking unit 122 in accordance with the above order. For example, the command responder 638 controls the operation of at least one of the slots 124 in accordance with the above order.

The command responder 638 may determine whether to execute the operation according to the order from the command transmitter 678. The command responder 638 may transmit information representing the execution result of the operation instructed by the order from the command transmitter 678, to the controller 376. For example, the command responder 638 transmits information representing whether the stocking unit 122 has executed the operation in accordance with the order received from the controller 376, to the controller 376. The command responder 638 may transmit information representing the operation that has not executed by the stocking unit 122 in accordance with the order received from the controller 376, to the controller 376. The command responder 638 may transmit information representing whether each of the one or more operations instructed by the order received from the controller 376 has been executed, to the controller 376.

In an embodiment, when the slot 124 determined as the target slot by the attachment/detachment slot determiner 674 in the above order and the slot 124 having the abnormality acquired by the abnormality detector 632 are identical, the command responder 638 determines not to attach or detach the mobile battery 20 in the above slot 124. In addition, the command responder 638 transmits (i) information representing that the attachment or detachment of the mobile battery 20 is prohibited in the specified slot 124 and/or (ii) information representing that the mobile battery 20 cannot be attached or detached in the specified slot 124, to the controller 376.

According to the above embodiment, for example, even if the time difference between the detection of the abnormality and the choosing of the slot 124 is extremely small, and the slot 124 detected as having abnormality was chosen by any chance, the execution of the attachment or detachment of the mobile battery 20 is discontinued. Thus, the safety of the battery exchanger 120 is improved compared to an embodiment where the identification information of the slot 124 having the abnormality acquired by the abnormality detector 632 is notified to the controller 376 in advance when the abnormality detector 632 acquires (which may be referred to as detects) said abnormality.

In another embodiment, if the slot 124 determined as the target slot by the charge/discharge slot determiner 676 in the above order and the slot 124 having the abnormality acquired by the abnormality detector 632 are identical, the command responder 638 determines not to charge or discharge the mobile battery 20 in the above slot 124. In addition, the command responder 638 transmit (iii) information representing that the charge or discharge of the mobile battery 20 is prohibited in a specified slot 124 and/or (iv) information representing the mobile battery 20 cannot be charged or discharged in the specified slot 124, to the controller 376.

According to the above embodiment, for example, even if the time difference between the detection of the abnormality and the choosing of the slot 124 is extremely small, and the slot 124 detected as having abnormality was chosen by any chance, the execution of the charge or discharge of the mobile battery 20 is discontinued. Thus, the safety of the battery exchanger 120 is improved compared to an embodiment where the identification information of the slot 124 having the abnormality acquired by the abnormality detector 632 is notified to the controller 376 in advance when the abnormality detector 632 acquires said abnormality.

In still another embodiment, the command responder 638 determines whether to execute the operation according to the order from the command transmitter 678 based on the state of the stocking unit 122, the slot 124, or the mobile battery 20 stocked by the slot 124. The command responder 638 may acquire information representing the state of the stocking unit 122, the slot 124, or the mobile battery 20 stocked by the slot 124 from the sensing unit 240 and the sensing unit 332.

As described above, the command responder 638 forms the flow of the processing including one or more processes for controlling the operation of at least one of the plurality of slots 124 in accordance with the order from the command transmitter 678. The command responder 638 determines whether each of the one or more processes can be executed.

For example, when a process includes an operation concerning the safety of the mobile battery 20 or the safety of the user 40 or the maintenance personnel of the battery exchanger 120, the command responder 638 determines whether the condition to permit the execution of the operation concerning said safety is satisfied. If it is determined that the above condition is satisfied, the command responder 638 determines that said process can be executed. On the other hand, if it is determined that the above condition is not satisfied, the command responder 638 determines that said process cannot be executed.

For the process determined as a process that can be executed, the command responder 638 generates an order to control the slot 124 to be the target of said process. The command responder 638 transmits the generated order to the slot 124 to be the control target and controls the operation of the above slot 124.

For the process determined as a process that cannot be executed, the command responder 638 does not generate an order for controlling the slot 124 to be the target of said process. The command responder 638 transmits information representing that some of the processes related to the order are prohibited and/or the information representing that some of the processes related to the order cannot be executed, to the controller 376.

The attachment/detachment slot determiner 674 may be an example of the control apparatus. The control apparatus may be an example of the information processing apparatus that processes information for controlling the stocking apparatus.

Figure 7:
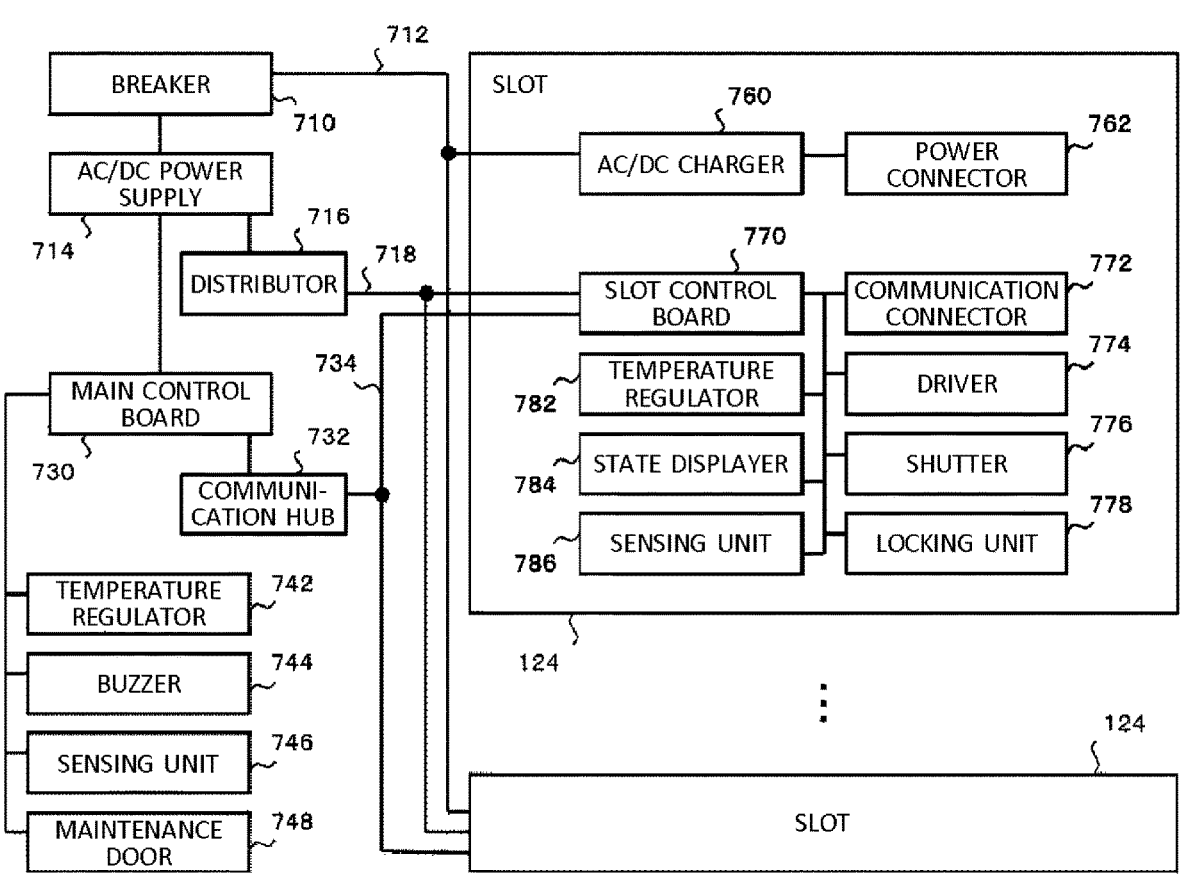
FIG. 7 schematically illustrates an example of an internal configuration of mounted equipment 330.

FIG. 7 schematically illustrates an example of the internal configuration of the mounted equipment 330. In the present embodiment, for the purpose of brief description, a case where the slot 124 does not have the function of discharging the mobile battery 20 is used as an example to describe the detail of the mounted equipment 330. However, persons skilled in the art who encounter the description in the present specification will understand that the configuration of the slot 124 can be modified such that the slot 124 can charge and discharge the mobile battery 20.

In the present embodiment, the mounted equipment 330 includes one or more slots 124, a breaker 710, a power line 712, an AC/DC power supply 714, a distributor 716, a power line 718, a main control board 730, a communication hub 732, a communication line 734, a temperature regulator 742, a buzzer 744, a sensing unit 746, and a maintenance door 748. In the present embodiment, the slot 124 includes an AC/DC charger 760, a power connector 762, a slot control board 770, a communication connector 772, a driver 774, a shutter 776, a locking unit 778, a temperature regulator 782, a state displayer 784, and a sensing unit 786.

In the present embodiment, the breaker 710 receives power from the power system 12. The breaker 710 supplies the power received from the power system 12 via the power line 712 to the AC/DC charger 760 of each of the one or more slots 124. The breaker 710 supplies the power received from the power system 12 to the AC/DC power supply 714. Examples of the breaker 710 include a circuit breaker, a residual current circuit breaker with overcurrent protection, and the like.

In the present embodiment, the AC/DC power supply 714 functions as a power supply to supply power for control. For example, the AC/DC power supply 714 converts AC power received from the breaker 710 into DC power having an appropriate voltage. The AC/DC power supply 714 supplies the converted DC power to the slot control board 770 of each of the one or more slots 124 via the distributor 716 and the power line 718. In addition, the AC/DC power supply 714 supplies the converted DC power to the main control board 730.

In the present embodiment, the main control board 730 controls the operation of each component of the stocking unit 122. The main control board 730 is connected to a CPU board 820 via the communication line 310. The main control board 730 may function as the controller 336. The main control board 730 may cooperate with the slot control board 770 to function as the controller 336.

The main control board 730 transmits/receives information to/from the slot control board 770 of each of the one or more slots 124 via the communication hub 732 and the communication line 734. The main control board 730 may control the operation of the temperature regulator 742, the buzzer 744, the sensing unit 746, and the maintenance door 748. The main control board 730 may acquire information representing the states of the temperature regulator 742, the buzzer 744, the sensing unit 746, and the maintenance door 748.

For example, the main control board 730 acquires information representing the measurement result of the sensing unit 746 from the sensing unit 746. In addition, the main control board 730 acquires information representing the open/close state of the maintenance door 748 from the maintenance door 748.

In the present embodiment, the temperature regulator 742 regulates the internal temperature of the housing 320 of the stocking unit 122. Examples of the temperature regulator 742 include a fan, a water-cooled chiller, and the like.

In the present embodiment, the buzzer 744 alerts the user 40 to the state of the stocking unit 122. The buzzer 744 may output a warning sound. The buzzer 744 may output a kind of warning specified by the main control board 730 among a plurality of warning sounds in different warning patterns.

In the present embodiment, the sensing unit 746 acquires information representing the state of the stocking unit 122. The sensing unit 746 may include a plurality of types of sensors. Examples of the sensors included in the sensing unit 746 include a temperature sensor, a vibration sensor, an electric leakage sensor, and the like. The sensing unit 746 may constitute at least part of the sensing unit 332.

In the present embodiment, the maintenance door 748 is arranged at the aperture (not depicted) of the housing 320 and utilized by the maintenance personnel of the battery exchanger 120 to perform maintenance management on the battery exchanger 120. The maintenance door 748 may output information representing its open/close state to the main control board 730. For example, when the maintenance door 748 is opened, the maintenance door 748 outputs a signal representing that the maintenance door 748 is opened.

In the present embodiment, the AC/DC charger 760 charges the mobile battery 20 electrically connected to the power connector 762. The AC/DC charger 760 adjusts at least one of the voltage or current applied to the mobile battery 20 electrically connected to the power connector 762 in accordance with the instruction of the slot control board 770.

In the present embodiment, the power connector 762 includes an electrical terminal that is electrically connected to the power connector 212 of the mobile battery 20 when the slot 124 accommodates the mobile battery 20. The power connector 762 may be a female connector, or may be a male connector. In the present embodiment, the power connector 762 is configured to be able to be moved by the driver 774. Note that the power connector 762 may be fixed inside the slot 124, in another embodiment.

In the present embodiment, the slot control board 770 controls the operation of each component of the slot 124. The slot control board 770 may control the operation of the slot 124 in accordance with the instruction from the main control board 730. The slot control board 770 may function as the controller 336. The slot control board 770 may cooperate with the main control board 730 to function as the controller 336.

The slot control board 770 may transmit/receive information to/from the controller 230 of the mobile battery 20 stocked by the slot 124 via the communication connector 772. For example, the slot control board 770 can read the information stored in the storage 250 of the mobile battery 20. In addition, the slot control board 770 can write information on the storage 250 of the mobile battery 20.

In the present embodiment, the communication connector 772 includes a communication terminal that is communicatively connected to the communication connector 214 of the mobile battery 20 when the slot 124 accommodates the mobile battery 20. In the present embodiment, the communication connector 772 is configured to be able to be moved by the driver 774. Note that the communication connector 772 may be fixed inside the slot 124, in another embodiment.

In the present embodiment, the driver 774 drives various movable members arranged in the slot 124. The driver 774 may drive the above movable members in accordance with the instruction from the slot control board 770. Examples of the movable member include the power connector 762, the communication connector 772, the shutter 776, the locking unit 778, the withdrawal prevention member arranged in the slot 124, the mechanism to restrain the mobile battery 20 arranged in the slot 124, and the like.

In the present embodiment, the shutter 776 is arranged at the aperture (not depicted) of the slot 124 and controls whether the mobile battery 20 can be inserted/taken out by the user 40. The shutter 776 may control its open/close in accordance with the instruction from the slot control board 770.

For example, when the shutter 776 is in an open state, the user 40 can insert the mobile battery 20 into the slot 124 and/or take out the mobile battery 20 from the slot 124. On the other hand, when the shutter 776 is in a close state, the user 40 cannot insert the mobile battery 20 into the slot 124 and/or take out the mobile battery 20 from the slot 124.

In the present embodiment, the locking unit 778 switches a locked state and an unlocked state of the shutter 776. The locking unit 778 may switch the locked state and the unlocked state of the shutter 776 in accordance with the instruction from the slot control board 770.

In the present embodiment, the temperature regulator 782 regulates the internal temperature of the slot 124. In the present embodiment, the temperature regulator 782 may regulate the internal temperature of the slot 124 in accordance with the instruction from the slot control board 770. Examples of the temperature regulator 782 include a fan, a water-cooled chiller, and the like.

In the present embodiment, the state displayer 784 notifies the state of the slot 124 to the user 40. Examples of the state of the slot 124 include the presence or absence of the mobile battery 20, the presence or absence of the abnormality, and the like. The state displayer 784 may notify the state of the slot 124 to the user 40, for example, in a lighting pattern, flashing pattern, or displaying pattern specified by the slot control board 770 among a plurality of lighting patterns, a plurality of flashing patterns, or a plurality of displaying patterns. Examples of the state displayer 784 include an LED, a display, and the like.

In the present embodiment, the sensing unit 786 acquires information representing the state of the slot 124. The sensing unit 786 may include a plurality of types of sensors. Examples of the sensor included in the sensing unit 786 include a temperature sensor, a voltage sensor, a current sensor, and the like. For example, the sensing unit 786 includes at least one of (i) a temperature sensor which measures the temperature of the inside of the slot 124 or the temperature of the mobile battery 20 or the neighborhood of the mobile battery 20, (ii) a voltage sensor which measures the voltage of the power connector 762, or (iii) a current sensor which measures the current flowing through the power connector 762. The sensing unit 786 may constitute at least part of the sensing unit 332.

The main control board 730 may be an example of the control apparatus. The main control board 730 may function as part of the control apparatus. The main control board 730 may cooperate with at least one of the slot control board 770 or the CPU board 820 to function as the control apparatus or part of the control apparatus. The AC/DC charger 760 may be an example of the power transferor. The power connector 762 may be an example of the second terminal. The slot control board 770 may be an example of the control apparatus. The slot control board 770 may function as part of the control apparatus. The slot control board 770 may cooperate with the main control board 730 to function as the control apparatus or part of the control apparatus. The control apparatus may be an example of the information processing apparatus that processes information for controlling the stocking apparatus.

Example of Another Embodiment

In the present embodiment, a case where the slot 124 includes the AC/DC charger 760 is used as an example to describe an example of the slot 124. However, the mounted equipment 330 is not limited to the present embodiment. As described above, in another embodiment, the slot 124 may have the configuration such that the slot 124 can charge and discharge the mobile battery 20. For example, the slot 124 may include an AC/DC converter.

Figure 8:
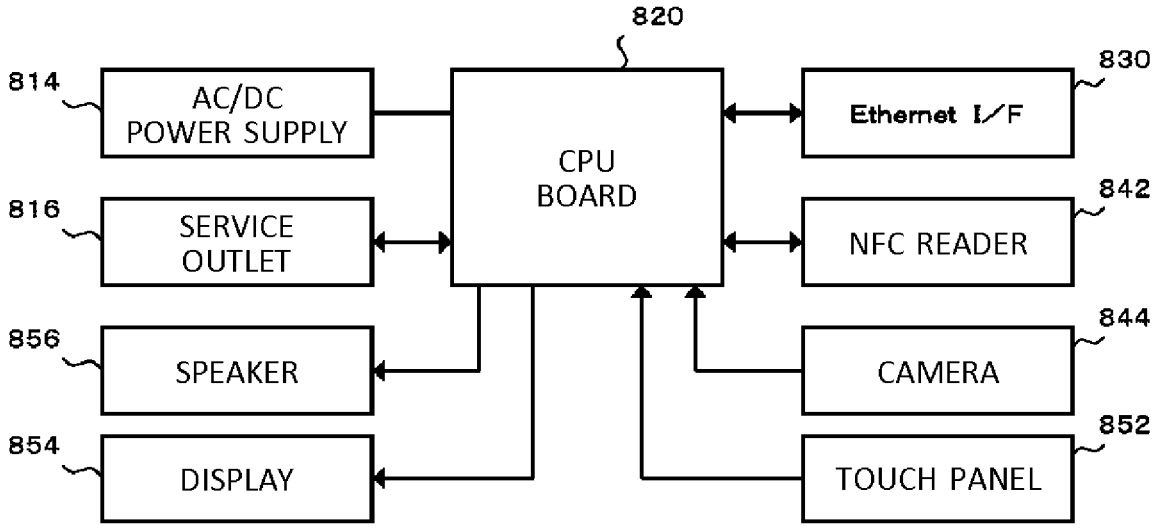
FIG. 8 schematically illustrates an example of an internal configuration of mounted equipment 370.

FIG. 8 schematically illustrates an example of the internal configuration of the mounted equipment 370. In the present embodiment, the mounted equipment 370 includes an AC/DC power supply 814, a service outlet 816, a CPU board 820, an Ethernet interface 830, which is a communication interface of an Ethernet (registered trademark), an NFC reader 842, camera 844, touch panel 852, a display 854, and a speaker 856.

In the present embodiment, the AC/DC power supply 814 functions as a power supply to supply power for control. The AC/DC power supply 814 receives power from the power system 12 via the uninterruptible power supply apparatus 312, for example. The AC/DC power supply 814 converts AC power received from the power system 12 into DC power having an appropriate voltage. The AC/DC power supply 814 supplies the converted DC power to the CPU board 820.

In the present embodiment, the service outlet 816 supplies power to external equipment of the communication unit 126. Examples of the external equipment include the router 314.

The service outlet 816 receives power from the power system 12 via the uninterruptible power supply apparatus 312, for example. The service outlet 816 may control the supply of power to the external equipment in accordance with the instruction from the CPU board 820. The service outlet 816 may transmit information concerning the power supplied to the external equipment, to the CPU board 820.

The CPU board 820 controls the operation of each component of the communication unit 126. The CPU board 820 is connected to the main control board 730 via the communication line 310. The CPU board 820 may function as the controller 376.

In the present embodiment, the Ethernet interface 830 is connected to the communication network 14 via the router 314. The Ethernet interface 830 may function as the communication interface 128.

In the present embodiment, the NFC reader 842 transmits/receives information to/from the communication terminal 42 via near field wireless communication. The NFC reader 842 may function as the communication interface 128. The NFC reader 842 may function as the user identifier 374.

In the present embodiment, the camera 844 captures the image of the user 40. The camera 844 may function as the user interface 372. The camera 844 may function as the user identifier 374.

In the present embodiment, the touch panel 852 accepts a touch input from the user 40. The touch panel 852 may function as the user interface 372. In the present embodiment, the display 854 presents information to the user 40 by outputting an image. The display 854 may function as the user interface 372. In the present embodiment, the speaker 856 presents information to the user 40 by outputting an audio output. The speaker 856 may function as the user interface 372.

The CPU board 820 may be an example of the control apparatus. The CPU board 820 may function as part of the control apparatus. The CPU board 820 may cooperate with the main control board 730 to function as the control apparatus or part of the control apparatus. The control apparatus may be an example of the information processing apparatus that processes information for controlling the stocking apparatus.

FIG. 9 illustrates examples of commands output by the controller 376. In FIG. 9, the name of each command and the content of each command are shown. As described in connection with FIG. 3 and FIG. 6, the controller 336 controls the operation of each component of the stocking unit 122 based on the content represented by the command transmitted from the controller 376. In addition, the controller 336 transmits information representing whether the operation represented by the above command has been executed, to the controller 376.

In an embodiment, in response to receiving a command from the controller 376, the controller 336 determines whether the operation represented by said command can be executed. The controller 336 transmits information representing whether the operation represented by said command has been executed based on the above determination result, to the controller 376.

In another embodiment, the controller 336 determines whether the operation represented by said command has been executed based on at least one of the output of the sensing unit 746 or the output of the sensing unit 786. The controller 336 transmits information representing whether the operation represented by said command has been executed based on the above determination result, to the controller 376.

(Specific Example of Manner of Utilizing Battery Exchanger 120)

As described in connection with FIG. 3, according to the present embodiment, the battery exchanger 120 includes a plurality of stocking units 122 formed separately and independently. In addition, each of the plurality of stocking units 122 includes a plurality of slots 124, each of which stocks a mobile battery 20.

As described above, according to the present embodiment, in response to the battery exchanger 120 receiving a lending request for the mobile battery 20 from the user 40, the battery exchanger 120 dispenses the mobile battery 20 that meets said request. For example, the battery exchanger 120 dispenses the mobile battery 20 having an SOC greater than a predetermined value. In addition, the battery exchanger 120 receives the mobile battery 20 returned by the user 40.

If the number of the mobile batteries 20 that meet the above request is greater than the number of the mobile batteries 20 requested by the user 40, the battery exchanger 120 determines the slot 124 to be utilized for receiving the mobile battery 20 or for dispensing the mobile battery 20 (which may be referred to as utilization slot) among a plurality of slots 124 stocking the mobile batteries 20 that meet the request of the user 40 (which may be referred to as available slots). There are some possible ways to determine the utilization slot among available slots.

For example, it is possible that the battery exchanger 120 determines the utilization slot randomly from the available slots. In this case, the physical positional relationship between utilization slots is not considered, and thus there is a possibility that the distance between the utilization slots is large. When the physical distance between the utilization slots is very large, there is a possibility that the user experience of the user 40 is degraded.

The utilization history in the past is not considered as well, and thus there is a possibility that a particular slot 124 or a particular battery exchanger 120 is intensively utilized in a short period. There is a possibility that the intensive utilization of a particular slot 124 or a particular battery exchanger 120 in a short period results in variation in the progress speed of deterioration of the slot 124 or the battery exchanger 120 between each of the slots 124 arranged in the battery exchangers 120. For example, if a particular slot 124 or a particular battery exchanger 120 is intensively utilized in a short period, the temperature of the above slot 124 or the battery exchanger 120 in which the above slot 124 is arranged becomes higher than the temperatures of other slots 124 or other battery exchangers 120. Generally, the deterioration of an electronic component depends on its temperature, and thus the above rise in the temperature can accelerate the progress in the deterioration.

Another possible way of determining the utilization slot from available slots is determining the utilization slot in consideration of at least one of (i) the physical positional relationship between the slots 124 or between the stocking units 122 included in the battery exchanger 120, (ii) the utilization history of each of the plurality of slots 124 or stocking units 122 included in the battery exchanger 120, or (iii) the temperature of each of the plurality of slots 124 and stocking units 122 included in the battery exchanger 120. The above utilization history may be the utilization history in a particular period in the past. The above period may be determined based on the period length, the number of utilizing people, or the number of utilization.

Figure 10:
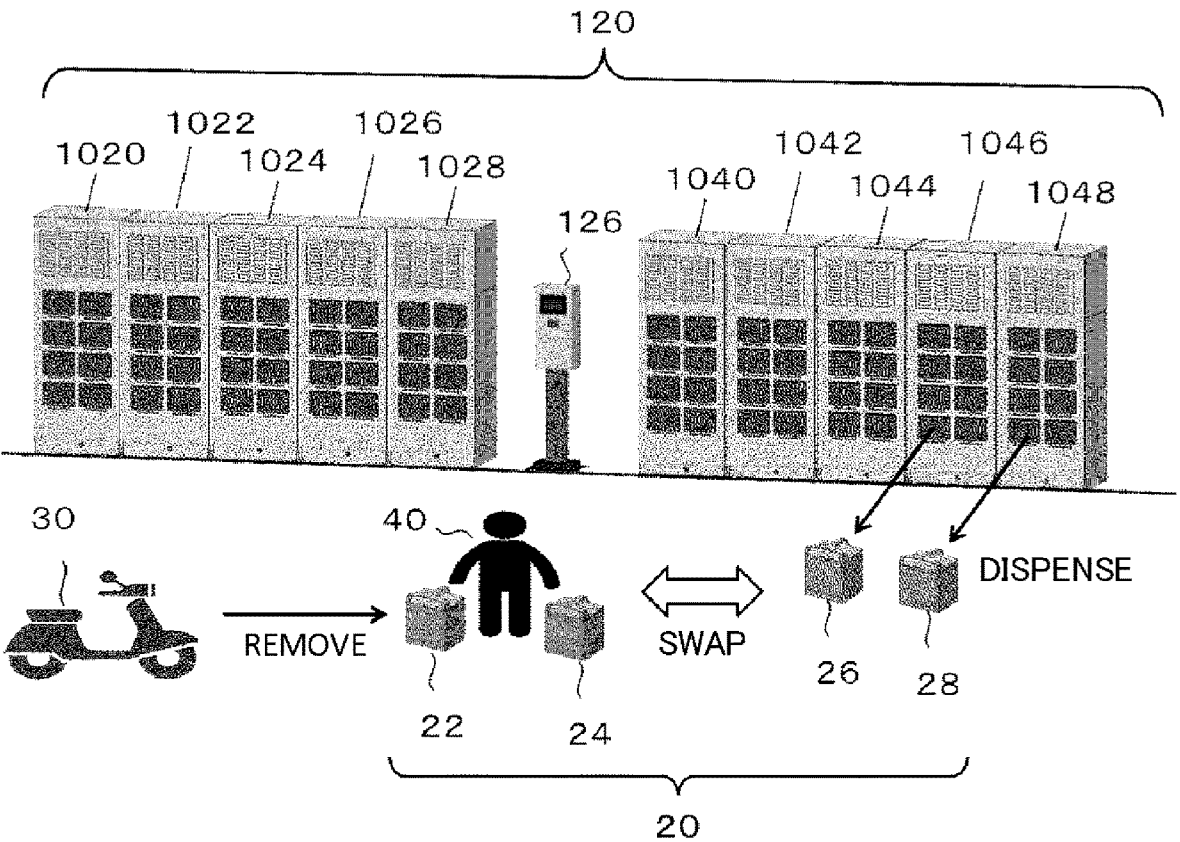
FIG. 10 schematically illustrates an example of the manner of utilizing the battery exchanger 120.
Figure 11:
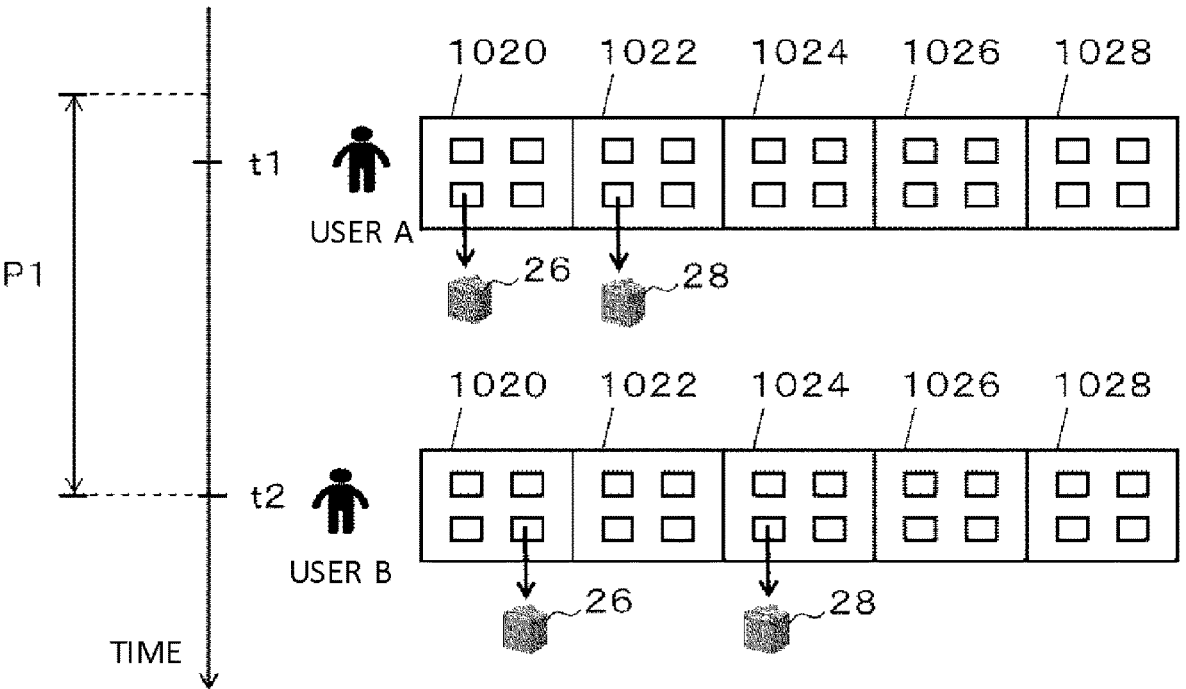
FIG. 11 schematically illustrates an example of the manner of utilizing the battery exchanger 120.
Figure 12:
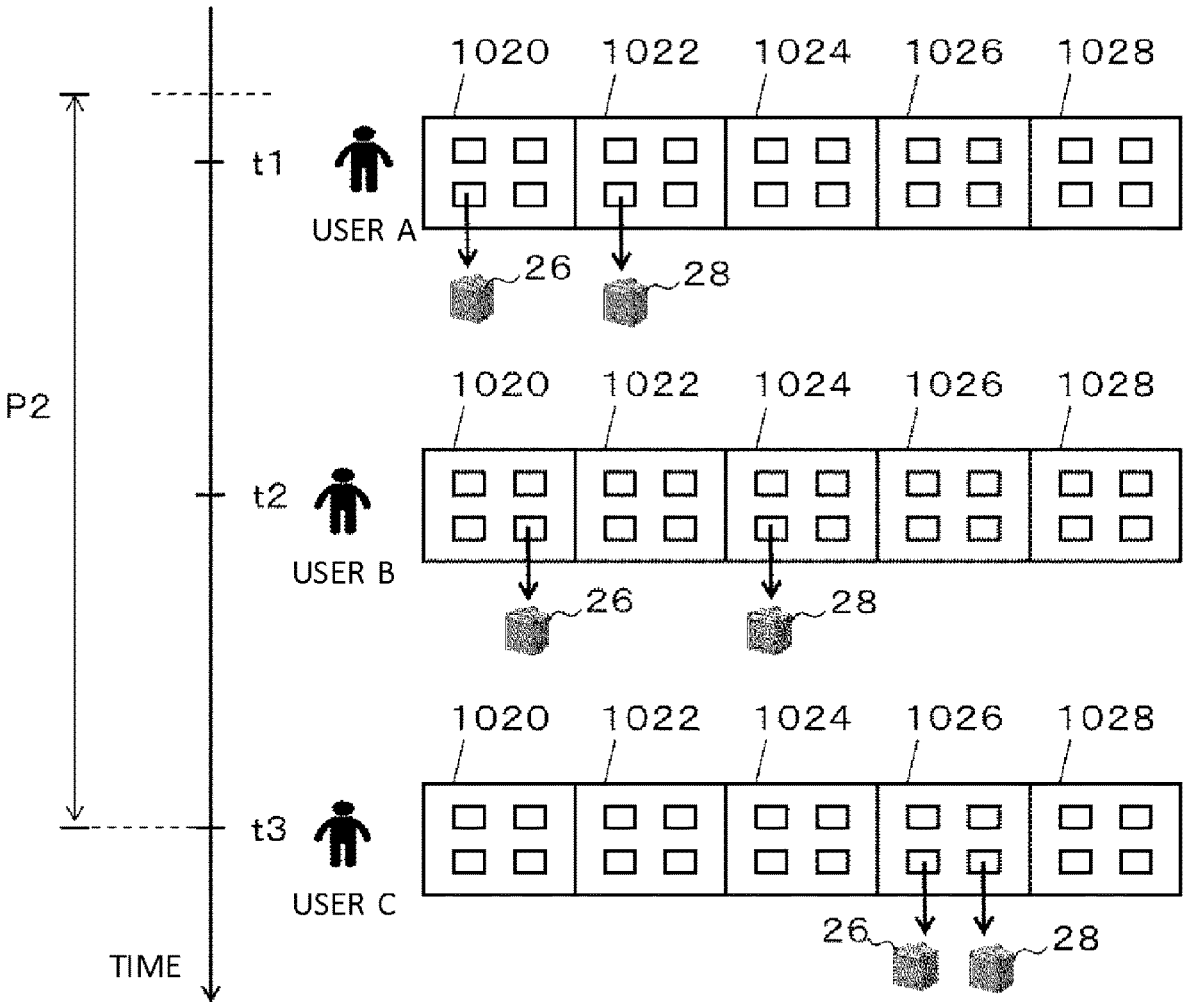
FIG. 12 schematically illustrates an example of the manner of utilizing the battery exchanger 120.

FIG. 10, FIG. 11, and FIG. 12 are each used to illustrate an example of the manner of utilizing the battery exchanger 120. In addition, FIG. 10, FIG. 11, and FIG. 12 are each used to illustrate an example of the way of determining the utilization slot in consideration of at least one of the physical positional relationship, the utilization history, or the temperature mentioned above.

FIG. 10 illustrates an example of the procedure through which a particular user 40 swaps a mobile battery 22 and a mobile battery 24 mounted to the electric motorcycle 30 and a mobile battery 26 and a mobile battery 28 stocked by the battery exchanger 120 by utilizing the battery exchanger 120. As shown in FIG. 10, in the present embodiment, the battery exchanger 120 includes the communication unit 126. In addition, the battery exchanger 120 includes a stocking unit 1020, a stocking unit 1022, a stocking unit 1024, a stocking unit 1026, a stocking unit 1028, a stocking unit 1040, a stocking unit 1042, a stocking unit 1044, a stocking unit 1046, and a stocking unit 1048, each of which is the stocking unit 122 mentioned above.

In the present embodiment, the stocking unit 1020, the stocking unit 1022, the stocking unit 1024, the stocking unit 1026, and the stocking unit 1028 are arranged on the left side of the communication unit 126, in the drawing. In addition, the stocking unit 1040, the stocking unit 1042, the stocking unit 1044, the stocking unit 1046, and the stocking unit 1048 are arranged on the right side of the communication unit 126, in the drawing.

According to an embodiment, when the remaining capacity of the mobile battery 22 and the mobile battery 24 mounted to the electric motorcycle 30 is decreased, the user 40 moves the electric motorcycle 30 toward the battery exchanger 120 that is located nearby. When the user 40 arrives at the battery exchanger 120, the user 40 requests the lending of the mobile battery 20 stocked by the battery exchanger 120 by utilizing the user interface 372 of the communication unit 126, for example. In response to the controller 376 accepting the above lending request, the attachment/detachment slot determiner 674 determines the utilization slot among available slots. In this way, the mobile battery 26 and the mobile battery 28 are dispensed.

Then, the user 40 removes the mobile battery 22 and the mobile battery 24 from the electric motorcycle 30. The user 40 returns the mobile battery 22 and the mobile battery 24 removed from the electric motorcycle 30 to a battery return space provided in the battery exchanger 120. In addition, the user 40 attaches the mobile battery 26 and the mobile battery 28 dispensed from the battery exchanger 120 to the electric motorcycle 30. In this way, the exchange of the mobile battery 22 and the mobile battery 24 is completed.

According to another embodiment, when the remaining capacity of the mobile battery 22 and the mobile battery 24 mounted to the electric motorcycle 30 is decreased, the user 40 requests the battery management system 100 to lend a mobile battery 20 hold by a particular one of the battery exchanger 120. In response to the above lending request being accepted, the user 40 moves the electric motorcycle 30 toward the above battery exchanger 120. When the user 40 arrives at the battery exchanger 120, the user 40 requests user authentication by utilizing the user interface 372 of the communication unit 126, for example. When the user authentication performed by the controller 376 is completed, the attachment/detachment slot determiner 674 determines the utilization slot among available slots. In this way, the mobile battery 26 and the mobile battery 28 are dispensed.

Then, the user 40 removes the mobile battery 22 and the mobile battery 24 from the electric motorcycle 30. The user 40 returns the mobile battery 22 and the mobile battery 24 removed from the electric motorcycle 30 to a battery return space provided in the battery exchanger 120. In addition, the user 40 attaches the mobile battery 26 and the mobile battery 28 dispensed from the battery exchanger 120 to the electric motorcycle 30. In this way, the exchange of the mobile battery 22 and the mobile battery 24 is completed.

As described above, in these embodiments, the attachment/detachment slot determiner 674 determines the utilization slot in consideration of at least one of the physical positional relationship, the utilization history, the temperature mentioned above. Examples of the consideration related to the physical positional relationship include (i) whether the distance between the slot 124 to dispense the mobile battery 26 and the slot 124 to dispense the mobile battery 28 is smaller than a predetermined value, (ii) whether the slot 124 to dispense the mobile battery 26 and the slot 124 to dispense the mobile battery 28 are arranged in the same stocking unit 122 or adjacent two stocking units 122, (iii) whether the distance between the stocking unit 122 including the slot 124 to dispense the mobile battery 26 and the stocking unit 122 including the slot 124 to dispense the mobile battery 28 is smaller than a predetermined value, (iv) whether the distance between the stocking unit 122 including the slot 124 to dispense the mobile battery 26 and a reference position of the battery exchanger 120 and the distance between the stocking unit 122 including the slot 124 to dispense the mobile battery 28 and the reference position of the battery exchanger 120 satisfy a predetermined condition, and the like. Examples of the reference position of the battery exchanger 120 include the installing position of the communication unit 126, one of the ends of the battery exchanger 120, and the like.

Examples of the consideration related to the utilization history include (i) whether the utilization for returning or lending the mobile battery 20 in a particular period before the user 40 utilizes the battery exchanger 120 (which may simply be referred to as past) exists, (ii) whether the degree of utilization of the slot 124 in the above particular period exceeds a predetermined degree, and the like. The above particular period may be determined based on the period length, the number of utilizing people, or the number of utilization.

Examples of the consideration related to the temperature include (i) whether the temperature of the slot 124 and/or the stocking unit 122 at the point in time when the user 40 utilizes the battery exchanger 120 is within a predetermined range, (ii) whether the statistic of the temperature of the slot 124 and/or the stocking unit 122 in a particular period before the user 40 utilizes the battery exchanger 120 is within a predetermined range, and the like. For the above range, it is only required that at least one of the upper limit or the lower limit is defined. The above particular period may be determined based on the period length, the number of utilizing people, or the number of utilization. Examples of the above statistic include the average value, the median value, the mode value, and the like.

The utilization slot may be an example of the receiving-and-providing stocker. The mobile battery 20 returned by the user 40 may be an example the item received from the utilizer. The mobile battery 20 dispensed from the slot 124 may be an example of the item provided or released (which may simply be referred to as provided) to the utilizer. The mobile battery 20 lent to the user 40 may be an example of the item provided or released to the utilizer. The mobile battery 20 dispensed from the slot 124 may be an example of the item provided or released to the utilizer. The slot 124 to dispense the mobile battery 26 may be an example of the slot 124 to receive one of the mobile battery 22 or the mobile battery 24. The slot 124 to dispense the mobile battery 28 may be an example of the slot 124 to receive another of the mobile battery 22 or the mobile battery 24. Examples of the manner of providing the mobile battery 20 include (i) a manner in which the mobile battery 20 is offered for a fee or for free on the assumption of the return of the mobile battery 20 (which may be referred to as provided in a narrow sense), (ii) a manner in which the mobile battery 20 is offered for a fee or for free, not on the assumption of the return of the mobile battery 20 (which may be referred to as released), and the like.

Example of Another Embodiment

In the present embodiment, a case where the user 40 returns the mobile battery 22 and the mobile battery 24 removed from the electric motorcycle 30 to a battery return space provided in the battery exchanger 120 is used as an example to describe an example of the swapping procedure of the mobile battery 20. However, the swapping procedure of the mobile battery 20 is not limited to the present embodiment. In another embodiment, the user 40 may return the mobile battery 22 and the mobile battery 24 to the slots 124 in which the mobile battery 26 and the mobile battery 28 have been stocked.

FIG. 11 and FIG. 12 are each used to illustrate an example of the way in which the battery exchanger 120 determines the utilization slots in consideration of the utilization history. FIG. 11 illustrates an example of the way of determining the utilization slots when User A has utilized the battery exchanger 120 before User B utilizes the battery exchanger 120. FIG. 12 illustrates an example of the way of determining the utilization slots when User A and User B have utilized the battery exchanger 120 before User C utilizes the battery exchanger 120.

According to the example shown in FIG. 11, User A utilizes the battery exchanger 120 at time t1, and following User A, User B utilizes the battery exchanger 120 at time t2. The length of the period from time t1 to time t2 is shorter than the length of the above particular period P1.

According to the present embodiment, the slot 124 arranged in the stocking unit 1020 dispenses the mobile battery 26 to User A at time t1. The slot 124 arranged in the stocking unit 1022 also dispenses the mobile battery 28 to User A.

When User B utilizes the battery exchanger 120 at time t2, the attachment/detachment slot determiner 674 determines the slot 124 to dispense the mobile battery 26 and the mobile battery 28 to User B in consideration of the history of dispensing the mobile battery 20 to the user 40 who has utilized the battery exchanger 120 in the past. This prevents the same slot 124 from being utilized successively, and/or the frequency of utilization of a particular slot 124 from becoming excessively greater than the frequencies of utilization of other slots 124, for example.

In an embodiment, the attachment/detachment slot determiner 674 determines the utilization slots from available slots other than the slots 124 having dispensed the mobile battery 26 and the mobile battery 28 to User A, who is the previous user 40, among all of the available slots arranged in the battery exchanger 120. The attachment/detachment slot determiner 674 may determine the utilization slots from available slots other than the slots 124 having dispensed the mobile battery 26 and the mobile battery 28 to User A, who is the previous user 40, among the available slots arranged in the battery exchanger 120.

In this case, even if the slots 124 having dispensed the mobile battery 26 and the mobile battery 28 to User A, who is the previous user 40, are available at time t2, the attachment/detachment slot determiner 674 does not determine the slots 124 having dispensed the mobile battery 26 and the mobile battery 28 to the User A, who is the previous user 40, as the utilization slots. Determining the slots 124 having dispensed the mobile battery 26 and the mobile battery 28 to the User A, who is the previous user 40, as the utilization slots may be prohibited.

In another embodiment, the attachment/detachment slot determiner 674 determines utilization slots such that at least one of the plurality of utilization slots is chosen from the stocking unit 122 not having been utilized in a particular period in the past. This prevents, for example, the same stocking unit 122 from being utilized successively, and/or the frequency of utilization of a particular stocking unit 122 from becoming excessively greater than the frequencies of utilization of other stocking units 122.

According to the example shown in FIG. 11, the utilization slots are determined such that the stocking unit 122 including the slot 124 having dispensed the mobile battery 28 to User A, who is the previous user 40, (the stocking unit 1022 in FIG. 11) and the stocking unit 122 including the slot 124 to dispense the mobile battery 28 to User B, who is the present user 40, (the stocking unit 1024 in FIG. 11) are different. At this time, the attachment/detachment slot determiner 674 may determine the plurality of utilization slots such that the total of the distances between the utilization slots is smaller than a predetermined value. For example, the attachment/detachment slot determiner 674 determines two utilization slots such that the distance between the slot 124 to dispense the mobile battery 26 to User B and the slot 124 to dispense the mobile battery 28 to User B is smaller than a predetermined value.

In calculating the total of the distances between the utilization slots, the distance between utilization slots arranged in the same stocking unit 122 may be considered as a predetermined value. The predetermined value may be 0. The total of the distances between one or more stocking units 122 including each of the plurality of utilization slots may be utilized as the total of the distance between the utilization slots.

Time t2 may be an example of the point in time when the utilizer utilizes the stocking apparatus. The period P1 may be an example of the first period.

According to the example shown in FIG. 12, User A utilizes the battery exchanger 120 at time t1, and following User A, User B utilizes the battery exchanger 120 at time t2. Then, following User B, User C utilizes the battery exchanger 120 at time t3. The length of the period from time t1 to time t3 is shorter than the length of the above particular period P2.

According to the present embodiment, at time t1, the slot 124 arranged in the stocking unit 1020 dispenses the mobile battery 26 to User A, and the slot 124 arranged in the stocking unit 1022 dispenses the mobile battery 28 to User A. At time t2, the slot 124 arranged in the stocking unit 1020 dispenses the mobile battery 26 to User B, and the slot 124 arranged in the stocking unit 1024 dispenses the mobile battery 28 to User B.

As described above, in the present embodiment, the slot 124 dispensing the mobile battery 26 to User B and the slot 124 dispensing the mobile battery 26 to User A are different. In addition, the slot 124 dispensing the mobile battery 28 to User B and the slot 124 dispensing the mobile battery 28 to User A are also different.

When User C utilizes the battery exchanger 120 at time t3, the attachment/detachment slot determiner 674 determines the slot 124 to dispense the mobile battery 26 and the mobile battery 28 to User C in consideration of the history of dispensing the mobile battery 20 to the user who has utilized the battery exchanger 120 in the past. For example, the attachment/detachment slot determiner 674 determines the utilization slot such that the utilization of the slots 124 or the stocking units 122 having dispensed the mobile battery 26 and the mobile battery 28 to User A and B is restrained. This prevents the same slot 124 from being utilized successively, and/or the frequency of utilization of a particular slot 124 from becoming excessively greater than the frequencies of utilization of other slots 124, for example.

According to the example shown in FIG. 12, the utilization slot is determined from among available slots 124 arranged in the stocking unit 122 other than the stocking units 122 including the slots 124 having dispensed the mobile battery 26 and mobile battery 28 to User A and User B, who are each the user 40 who has utilized the battery exchanger 120 in the period P2 (where the stocking units 122 are stocking unit 1020, stocking unit 1022, and stocking unit 1024 in FIG. 12). At this time, the attachment/detachment slot determiner 674 may determine the plurality of utilization slots such that the total of the distances between the utilization slots is smaller than a predetermined value.

Time t3 may be an example of the point in time when the utilizer utilizes the stocking apparatus. Period P2 may be an example of the first period.

(Specific Example of Control Method of Battery Exchanger 120)

Figure 13:
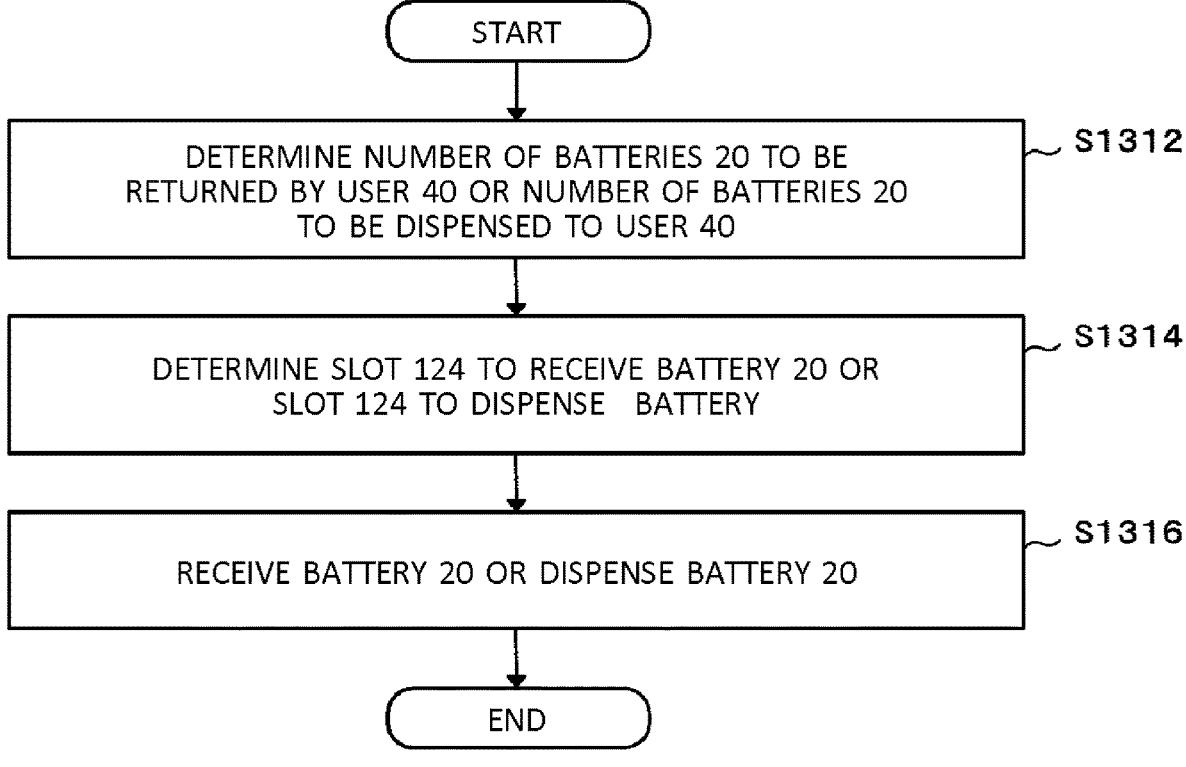
FIG. 13 schematically illustrates an example of the returning processing or dispensing processing of the mobile battery 20.
Figure 14:
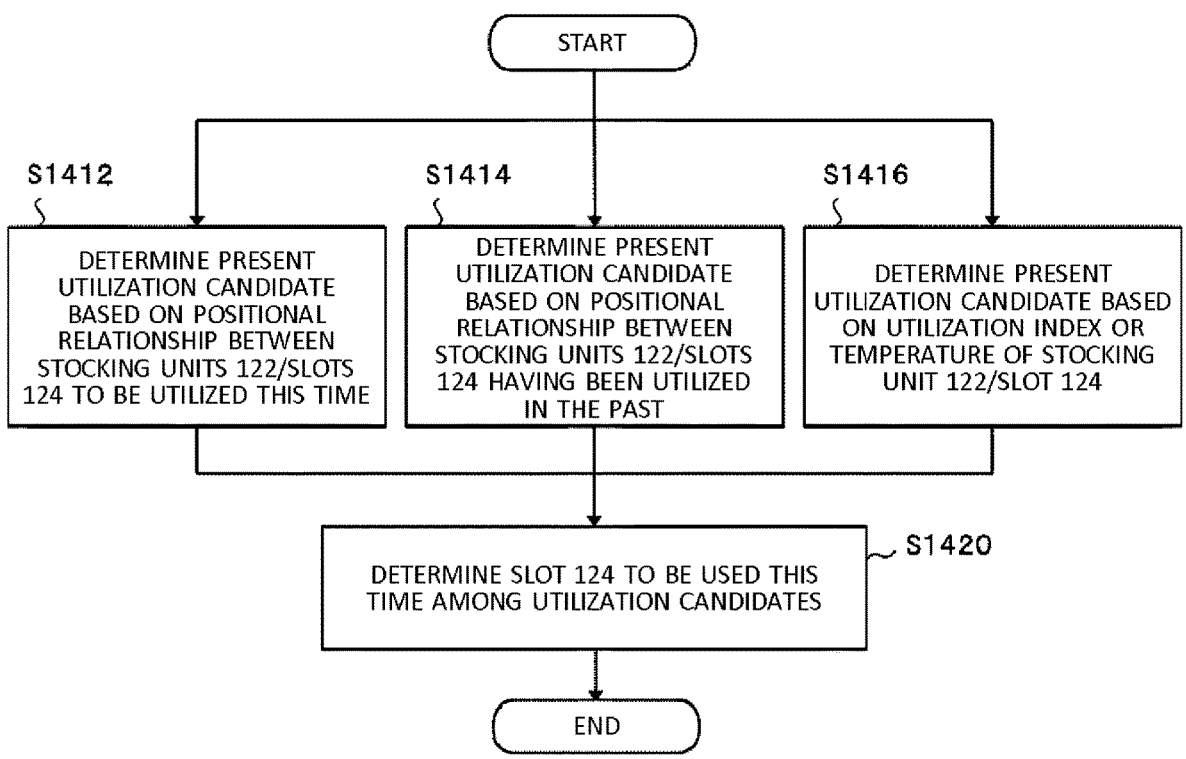
FIG. 14 schematically illustrates an example of a procedure of determining a utilization slot.

FIG. 13 and FIG. 14 are used to illustrate an example of the control method of the battery exchanger 120. The above control method of the battery exchanger 120 is implemented by the controller 376 described in connection with FIG. 3, for example. The controller 336 and the controller 376 described in connection with FIG. 3 may cooperate with each other so as to implement the above control method of the battery exchanger 120.

As described above, at least one of the main control board 730, the slot control board 770, or the CPU board 820 described in connection with FIG. 7 or FIG. 8 can function as the controller 376. The control method of the battery exchanger 120 described in connection with FIG. 13 and FIG. 14 may be implemented by at least one of the main control board 730, the slot control board 770, or the CPU board 820. For example, when a particular program is executed by at least one of the main control board 730, the slot control board 770, or the CPU board 820, the control method of the above battery exchanger 120 is implemented. The above program may be stored on a computer-readable storage medium. The computer-readable storage medium may be a non-transitory computer-readable storage medium.

The above program may be a program for causing the computer to implement the control method of the stocking apparatus. The above control method includes, for example, acquiring a demand number which is a number of the items to be received by the stocking apparatus from the utilizer of the stocking apparatus or a number of the items to be provided or released by the stocking apparatus to the utilizer of the stocking apparatus. For example, the above control method includes determining a receiving-and-providing stocker based on the demand number, wherein the receiving-and-providing stocker is one of the plurality of stockers of the plurality of first housings and receives the item from the utilizer or provides or releases the item to the utilizer.

FIG. 13 schematically illustrates an example of the returning processing or dispensing processing of the mobile battery 20. According to the present embodiment, first, at step (which may be abbreviated as S) 1312, for example, the attachment/detachment slot determiner 674 of the controller 376 determines a demand number which is the number of the mobile batteries 20 to be returned by the user 40 or the number of the mobile batteries 20 to be dispensed to the user 40. To be specific, the controller 376 acquires information representing the above demand number via the communication interface 128 or the user interface 372. The controller 376 may acquire the above information representing the demand number from the user 40 directly, from the communication terminal 42 of the user 40, or from the management server 140.

Then, at 51314, the attachment/detachment slot determiner 674 determines the slot 124 to receive the mobile battery 20 or the slot 124 to dispense the battery. The detail of the processing performed at 51314 will be described later.

Then, at 51316, the battery exchanger 120 receives the mobile battery 20 from the user 40 or dispenses the mobile battery 20 to the user 40. To be specific, the attachment/ detachment controller 634 controls the attachment or detachment of the mobile battery 20 to or from the one or more slots 124 determined by the attachment/detachment slot determiner 674. This allows, for example, the shutter arranged in the above slot 124 to be unlocked, and the user 40 can cause the mobile battery 20 to be accommodated in the slot 124. In addition, the mobile battery 20 accommodated in the slot 124 is released from restraint, and the user 40 can take out the mobile battery 20 from the slot 124.

FIG. 14 schematically illustrates an example of the procedure of determining the utilization slot. FIG. 14 describes the detail of the processing performed at 51314 described in connection with FIG. 13. According to the present embodiment, the candidates for the utilization slot are determined from among the available slots at S1412, S1414, and S1416, first. The processing performed at S1412, the processing performed at S1414, and the processing performed S1416 may be executed in a parallel fashion, or may be executed in sequence. One or two of the processing performed at S1412, the processing performed at S1414, and the processing performed S1416 may not be executed.

According to the present embodiment, at S1412, the above candidates are determined based on the positional relationship between the stocking units 122 or between the slots 124 to be utilized this time. For example, the above candidates are determined based on the demand number acquired at S1312 and the positional relationship between the stocking units 122 or between the slots 124 to be utilized this time.

In an embodiment, when the demand number is two or more, the attachment/detachment slot determiner 674 determines the utilization slots such that two slots 124 arranged in a single stocking unit 122 are included in the utilization slots, for example. When the demand number is two or more, the attachment/detachment slot determiner 674 may determine the utilization slots such that two slots 124 consisting of a slot 124 arranged in a particular stocking unit 122 and a slot 124 arranged in another stocking unit 122 adjacent to said particular stocking unit 122 are included in the utilization slots. In this way, the physical distance between the at least two utilization slots can be smaller than a predetermined value. As a result, the total of the distances between the utilization slots can be smaller than a predetermined value. The above embodiment becomes more effective when the battery exchanger 120 includes two or more stocking units. The above embodiment is greatly effective especially when the battery exchanger 120 includes three or more stocking units. If the battery exchanger 120 includes three or more stocking units, the battery exchanger 120 includes three or more housings 320. In this case, if the slots 124 of two housings 320 not adjacent to each other are determined as the utilization slots, the convenience of the user may be decreased. According to the above embodiment, such decrease in the convenience can be restrained.

In another embodiment, when the demand number is two, determining, as the utilization slots, two slots 124 consisting of a slot 124 arranged in a particular stocking unit 122 and a slot 124 arranged in another stocking unit 122 not adjacent to said particular stocking unit 122 may be prohibited. In this way, the physical distance between two utilization slots to dispense two mobile batteries 20 can be smaller than a predetermined value.

In another embodiment, when the demand number is two or more, if two or more slots 124 arranged in adjacent two stocking units 122 are available, the attachment/detachment slot determiner 674 may determine said two or more slots 124 as the utilization slots. In this way, the physical distance between the at least two utilization slots can be smaller than a predetermined value. As a result, the total of the distances between the utilization slots can be smaller than a predetermined value.

In another embodiment, when the demand number is two or more, the attachment/detachment slot determiner 674 determines the utilization slots such that the utilization slots do not include two slots 124 consisting of the slot 124 arranged in the first stocking unit 122 and the slot 124 arranged in the second stocking unit 122. Herein, the second stocking unit 122 is a stocking unit 122 different from the first stocking unit. The distance between the second stocking unit 122 and the first stocking unit 122 is larger than the distance between the first stocking unit 122 and a reference position of the battery exchanger 120. As described above, examples of the reference position of the battery exchanger 120 include the installing position of the communication unit 126, one of the ends of the battery exchanger 120, and the like.

In this way, for example, in the embodiment described in connection with FIG. 10, the utilization slots are determined among the plurality of available slots arranged in the plurality of stocking units 122 arranged on the left side of the communication unit 126 in the drawing. As a result, the total of the distances between the utilization slots can be smaller than a predetermined value.

According to the present embodiment, at S1414, the above candidates are determined based on the positional relationship between the stocking units 122 or between the slots 124 having been utilized in the past. For example, the above candidates are determined based on the demand number acquired at S1312 and the positional relationship between the stocking units 122 or between the slots 124 having been utilized in the past.

In an embodiment, the attachment/detachment slot determiner 674 determines the candidate for the utilization slot for the present user 40, for example, among the slots 124 other than the slot 124 determined as the utilization slot for another user 40 who has utilized the battery exchanger 120 before the present user 40, among the plurality of slots 124 arranged in the plurality of stocking units 122. The attachment/detachment slot determiner 674 may determine the candidate for the utilization slot for the present user 40 among the slots 124 other than the slot 124 determined as the utilization slot for another user 40 who has utilized the battery exchanger 120 before the present user 40, among the plurality of available slots. The attachment/detachment slot determiner 674 may determine the candidate for the utilization slot for the present user 40 among the slots 124 arranged in the stocking units 122 other than the stocking unit 122 including the slot 124 determined as the utilization slot for another user 40 who has utilized the battery exchanger 120 before the present user 40.

The another user 40 who has utilized the battery exchanger 120 before the present user may be another user 40 who has utilized the battery exchanger 120 n times before the present user 40 (where n is a positive integer being greater than or equal to 1). In the embodiment described in connection with FIG. 11, the another user 40 who has utilized the battery exchanger 120 before the present user 40 is User A, for example. In the embodiment described in connection with FIG. 12, the another user 40 who has utilized the battery exchanger 120 before the present user 40 is User B, or User A and User B, for example.

This restrains the same slot 124 from being utilized successively. As a result, the rise in the temperature of the above slot 124 and/or the stocking unit 122 including the above slot 124 can be restrained. The restrained rise in the temperature of the slot 124 or the stocking unit 122 can restrain the progress of deterioration of the slot 124 or the stocking unit 122.

In another embodiment, the attachment/detachment slot determiner 674 may determine the candidate for the utilization slot for the present user 40 among the slots 124 other than the slot 124 determined as the utilization slot in the first period which is a period before the time at which the present user 40 utilizes the battery exchanger 120 and has a predetermined length, among the plurality of slots 124 of the plurality of stocking units 122. The attachment/detachment slot determiner 674 may determine the candidate for the utilization slot for the present user 40 among the slots 124 other than the slot 124 determined as the utilization slot in a particular period in the past, among the plurality of available slots. The attachment/detachment slot determiner 674 may determine the candidate for the utilization slot for the present user 40 among the slots 124 arranged in the stocking units 122 other than the stocking unit 122 including the slot 124 determined as the utilization slot in a particular period in the past.

The particular period in the past may be a period that is before the time at which the present user 40 utilizes the battery exchanger 120 and has a predetermined length. The beginning point of the particular period in the past may be determined based on the period length, the number of utilizing people, or the number of utilization.

This restrains the same slot 124 from being utilized successively. As a result, the rise in the temperature of the above slot 124 and/or the stocking unit 122 including the above slot 124 can be restrained. The restrained rise in the temperature of the slot 124 or the stocking unit 122 can restrain the progress of deterioration of the slot 124 or the stocking unit 122.

According to the present embodiment, at 1416, the above candidate is determined based on the utilization index or the temperature of the stocking unit 122 or the slot 124. For example, the above candidate is determined based on the demand number acquired at S1312 and the utilization index or the temperature of the stocking unit 122 or the slot 124.

In an embodiment, the attachment/detachment slot determiner 674 acquires a slot selection degree of each of the plurality of slots 124, wherein the slot selection degree is a degree to which each slot has been determined as the utilization slot before the time at which the present user 40 utilizes the battery exchanger 120. The attachment/detachment slot determiner 674 may acquire a slot selection degree of each of the plurality of available slots, wherein the slot selection degree is a degree to which each slot has been determined as the utilization slot before the time at which the present user 40 utilizes the battery exchanger 120. The slot selection degree may be the total value of the number of times of determination as the utilization slot in the past, or may be the total value of the number of times of determination as the utilization slot in a particular period in the past.

For example, the attachment/detachment slot determiner 674 calculates the slot selection degree of each of the plurality of slots 124 arranged in the battery exchanger 120 in advance. The attachment/detachment slot determiner 674 stores the identification information of each of the plurality of slots 124 and information representing the slot selection degree of each of the plurality of slots 124 in association with each other in an appropriate storage apparatus. When the attachment/detachment slot determiner 674 executes the determining processing of the utilization slot, the attachment/detachment slot determiner 674 accesses the above storage apparatus, for example, to acquire information representing the slot selection degree associated with the identification information of each of the plurality of available slots. Note that, in another embodiment, the attachment/detachment slot determiner 674 may access the management server 140 to acquire information representing the slot selection degree of each of the plurality of available slots from the management server 140.

The attachment/detachment slot determiner 674 may determine the candidate for the utilization slot for the present user 40 based on the slot selection degree of each of the plurality of slots 124. For example, the attachment/detachment slot determiner 674 determines the utilization slot such that the slot 124 having a smaller slot selection degree is determined as the utilization slot preferentially compared to the slot 124 having a larger slot selection degree. The attachment/detachment slot determiner 674 may determine the utilization slot such that the total of the slot selection degrees of the utilization slots is smaller than a predetermined value. The attachment/detachment slot determiner 674 may determine the candidate for the utilization slot for the present user 40 on a basis where the slot 124 having a smaller slot selection degree is more likely to be determined as the utilization slot than the slot 124 having a larger slot selection degree.

In another embodiment, the attachment/detachment slot determiner 674 acquires a unit selection degree of each of the plurality of stocking units 122, wherein the unit selection degree is a degree to which the slots 124 arranged in each stocking unit have been determined as the utilization slots before the time at which the present user 40 utilizes the battery exchanger 120. The unit selection degree of each stocking unit may be the total value of the number of times the plurality of slots 124 arranged in each stocking unit have been determined as the utilization slots in the past, or may be the total value of the number of times that the plurality of slots 124 arranged in each stocking unit have been determined as the utilization slots in a particular period in the past. The attachment/detachment slot determiner 674 may acquire the unit selection degree in a procedure similar to the procedure of acquiring the slot selection degree.

The attachment/detachment slot determiner 674 may determine the candidate for the utilization slot for the present user 40 based on the unit selection degree of each of the plurality of stocking units 122. For example, the attachment/detachment slot determiner 674 determines the utilization slot such that the slot 124 arranged in the stocking unit 122 having a smaller unit selection degree is determined as the utilization slot preferentially compared to the slot 124 arranged in the stocking unit 122 having a larger unit selection degree. The attachment/detachment slot determiner 674 may determine the utilization slot such that the total of the unit selection degrees of the one or more stocking units 122 in which each of the plurality of utilization slots is arranged is smaller than a predetermined value. The attachment/detachment slot determiner 674 may determine the candidate for the utilization slot for the present user 40 on a basis where the slot 124 arranged in the stocking unit 122 having a smaller unit selection degree is more likely to be determined as the utilization slot than the slot 124 arranged in the stocking unit 122 having a larger unit selection degree.

In another embodiment, the attachment/detachment slot determiner 674 acquire a slot charge/discharge degree of each of the AC/DC chargers 760 of the plurality of slots 124, wherein the slot charge/discharge degree is a degree to which each AC/DC charger has been utilized before the time at which the present user 40 utilizes the battery exchanger 120 and/or a degree to which each AC/DC charger is utilized at the time at which the present user 40 utilizes the battery exchanger 120. The slot charge/discharge degree of each AC/DC charger may be the total value of the number of times each AC/DC charger has been utilized for charging (or discharging) the mobile battery 20 in the past or the total value of input/output powers [W] or input/output power amounts [Wh] when each AC/DC charger was utilized for charging (or discharging) the mobile battery 20 in the past, or may be the total value of the number of times each AC/DC charger has been utilized for charging (or discharging) the mobile battery 20 in a particular period in the past or the total value of input/output powers [W] or input/output power amounts [Wh] when each AC/DC charger was utilized for charging (or discharging) the mobile battery 20 in a particular period in the past. The attachment/detachment slot determiner 674 may acquire the slot charge/discharge degree in a procedure similar to the procedure of acquiring the slot selection degree.

The attachment/detachment slot determiner 674 may determine the candidate for the utilization slot for the present user 40 based on the slot charge/discharge degree of the AC/DC charger 760 of each of the plurality of slots 124 (which may be referred to as the slot charge/discharge degree of the slot 124). For example, the attachment/detachment slot determiner 674 determines the utilization slot such that the slot 124 having a smaller slot charge/discharge degree is determined as the utilization slot preferentially compared to the slot 124 having a larger slot charge/discharge degree. The attachment/detachment slot determiner 674 may determine the utilization slot such that the total of the slot charge/discharge degrees of utilization slots is smaller than a predetermined value. The attachment/detachment slot determiner 674 may determine the candidate for the utilization slot for the present user 40 on a basis where the slot 124 having a smaller slot charge/discharge degree is more likely to be determined as the utilization slot than the slot 124 having a larger slot charge/discharge degree.

In another embodiment, the attachment/detachment slot determiner 674 acquires a unit charge/discharge degree of each of the plurality of stocking units 122, wherein the unit charge/discharge degree is a degree to which each AC/DC charger arranged in each stocking unit has been utilized before the time at which the present user 40 utilizes the battery exchanger 120 and/or a degree to which each AC/DC charger is utilized at the time at which the present user 40 utilizes the battery exchanger 120. The unit charge/discharge degree of each stocking unit may be the total value of the number of times the plurality of AC/DC chargers each arranged in each stocking unit have been utilized for charging (or discharging) the mobile battery 20 in the past or the total value of input/output powers [W] or input/output power amounts [Wh] when the plurality of AC/DC chargers each arranged in each stocking unit were utilized for charging (or discharging) the mobile battery 20 in the past, or may be the total value of the number of times the plurality of AC/DC chargers each arranged in each stocking unit have been utilized for charging (or discharging) the mobile battery 20 in a particular period in the past or the total value of input/output powers [W] or input/output power amounts

[Wh] when the plurality of AC/DC chargers each arranged in each stocking unit were utilized for charging (or discharging) the mobile battery 20 in a particular period in the past. The attachment/detachment slot determiner 674 may acquire the unit charge/discharge degree in a procedure similar to the procedure of acquiring the slot selection degree.

The attachment/detachment slot determiner 674 may determine the candidate for the utilization slot for the present user 40 based on the unit charge/discharge degree of each of the plurality of stocking units 122. For example, the attachment/detachment slot determiner 674 determines the utilization slot such that the slot 124 arranged in the stocking unit 122 having a smaller unit charge/discharge degree is determined as the utilization slot preferentially compared to the slot 124 arranged in the stocking unit 122 having a larger unit charge/discharge degree. The attachment/detachment slot determiner 674 may determine the utilization slot such that the total of the unit charge/discharge degrees of the one or more stocking units 122 in which each of the plurality of utilization slots is arranged is smaller than a predetermined value. The attachment/detachment slot determiner 674 may determine the candidate for the utilization slot for the present user 40 on a basis where the slot 124 arranged in the stocking unit 122 having a smaller unit charge/discharge degree is more likely to be determined as the utilization slot than the slot 124 arranged in the stocking unit 122 having a larger unit charge/discharge degree.

In another embodiment, the attachment/detachment slot determiner 674 acquires the temperature of each of the plurality of slots 124, or the temperature of each of the plurality of mobile batteries 20 stocked by each of the plurality of slots 124. The attachment/detachment slot determiner 674 acquires the above temperature of each component, for example, from the temperature sensor arranged in the sensing unit 786. The attachment/detachment slot determiner 674 may determine the candidate for the utilization slot for the present user 40 based on the above temperature of each component.

In another embodiment, the attachment/detachment slot determiner 674 acquires the internal temperature of each of the plurality of stocking units 122. The attachment/detachment slot determiner 674 acquires the above temperature, for example, from the temperature sensor arranged in the sensing unit 746. The attachment/detachment slot determiner 674 may determine the candidate for the utilization slot for the present user 40 based on the above temperature of each component.

Then, at 51420, the attachment/detachment slot determiner 674 determines the utilization slot for the present user 40 among the candidates for the utilization slot. Then, the processing ends.

The particular stocking unit 122 may be an example of the one of the plurality of first housings or the one of the plurality of housings. The slot 124 arranged in the particular stocking unit 122 may be an example of the one of the plurality of stockers. The another stocking unit 122 may be an example of the another one of the plurality of first housings or the another one of the plurality of housings. The slot 124 arranged in the another stocking unit 122 may be an example of the another one of the plurality of stockers. The particular period in the past may be an example of the first period. The slot selection degree may be an example of the stocker determination degree or the power transferor usage degree. The unit selection degree may be an example of the housing determination degree or the housing power transferor usage degree. The temperature of each of the plurality of slots 124 may be an example of the stocker temperature.

The temperature of the plurality of mobile batteries 20 each stocked by each of the plurality of slots 124 may be an example of the stocker temperature. The internal temperature of each of the plurality of stocking units 122 may be an example of the housing internal temperature.

Figure 15:
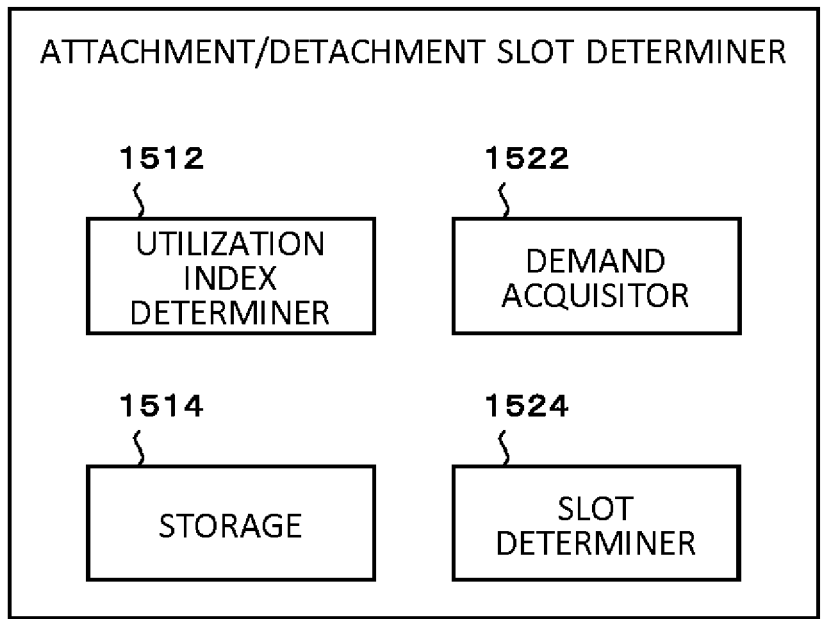
FIG. 15 schematically illustrates an example of an internal configuration of an attachment/detachment slot determiner 674.

FIG. 15 schematically illustrates an example of the internal configuration of the attachment/detachment slot determiner 674. In the present embodiment, the attachment/detachment slot determiner includes a utilization index determiner 1512, a storage 1514, a demand acquisitor 1522, and a slot determiner 1524. In the present embodiment, the attachment/detachment slot determiner 674 controls the battery exchanger 120 by determining the slot 124 to be utilized by the user 40.

In the present embodiment, the utilization index determiner 1512 determines various utilization indexes. Examples of the utilization index include a slot choice degree, a unit choice degree, a slot charge/discharge degree, a unit charge/discharge degree, and the like. The utilization index determiner 1512 stores information representing the determined utilization index in the storage 1514.

In the present embodiment, the demand acquisitor 1522 acquires the demand number mentioned above. The demand acquisitor 1522 may acquire the demand number in accordance with the procedure mentioned above.

In the present embodiment, the slot determiner 1524 determines the utilization slot among the plurality of slots 124 arranged in the plurality of stocking units 122 based on the demand number acquired by the demand acquisitor 1522. The slot determiner 1524 may determine the utilization slot in accordance with the procedure mentioned above.

The demand acquisitor 1522 may be an example of the acquisitor. The slot determiner 1524 may be an example of the determiner.

Figure 16:
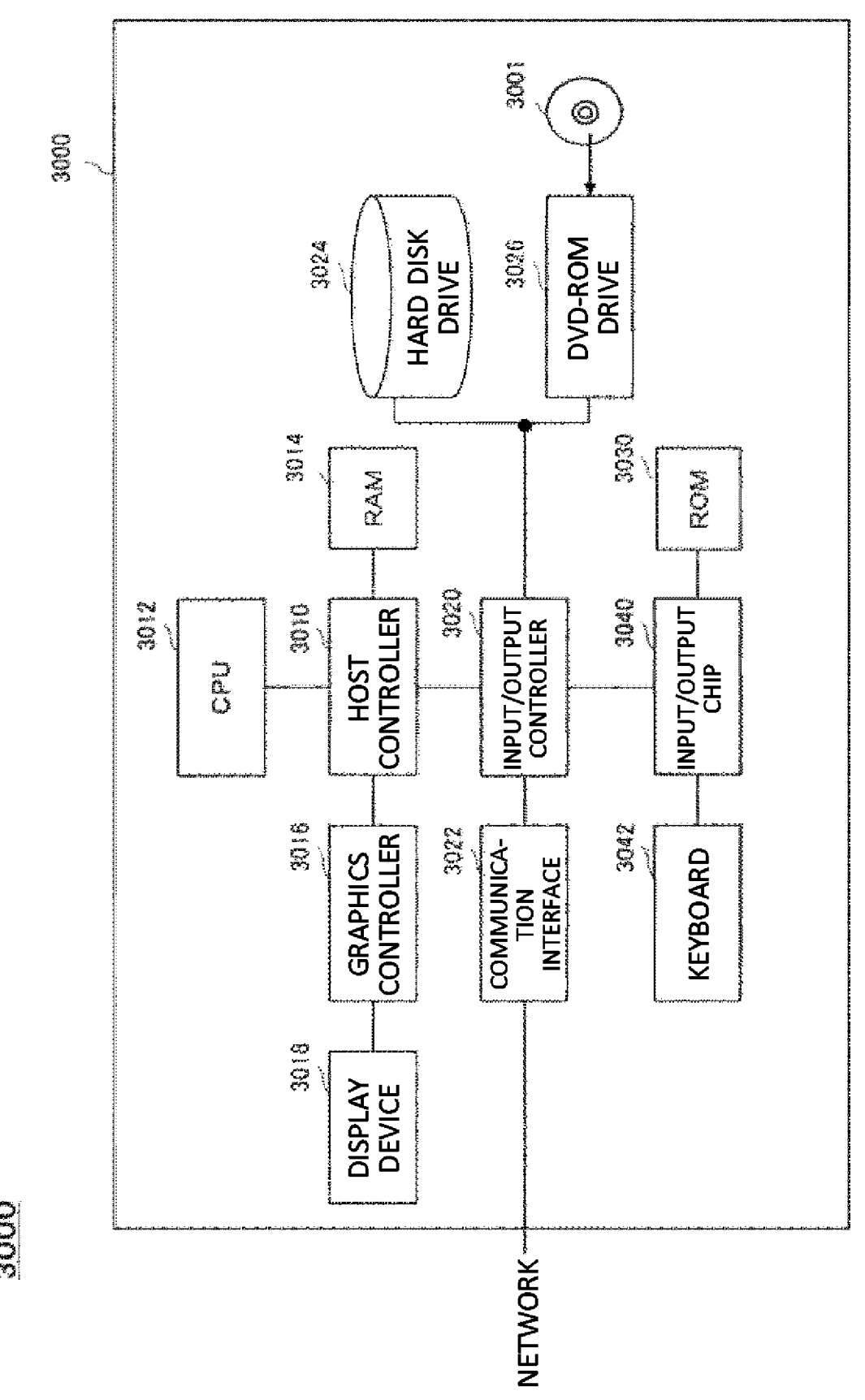
FIG. 16 schematically illustrates an example of an internal configuration of a computer 3000.

FIG. 16 illustrates an example of a computer 3000, in which a plurality of aspects of the present invention may be embodied entirely or partly. At least part of the battery management system 100 may be implemented by the computer 3000. For example, the controller 230 or part of the controller 230 is implemented by the computer 3000. For example, the controller 336 or part of the controller 336 is implemented by the computer 3000. For example, the controller 376 or part of the controller 376 is implemented by the computer 3000. For example, the information processing apparatus which processes information for controlling the stocking apparatus is implemented by the computer 3000. The above information processing apparatus may be a computer mounted to the battery exchanger 120, or may be a computer mounted to a communication apparatus such as a server configured to be able to communicate with the battery exchanger 120.

A program that is installed in the computer 3000 can cause the computer 3000 to perform an operation associated with an apparatus according to the embodiment of the present invention or to function as one or a plurality of "units" of the apparatus, or can cause the computer 3000 to perform the operation or said one or plurality of units thereof, and/or cause the computer 3000 to perform processes of the embodiment of the present invention or steps thereof. Such a program may be executed by a CPU 3012 to cause the computer 3000 to perform particular operations associated with some or all of the blocks of flowcharts and block diagrams described in the present specification.

The computer 3000 according to the present embodiment includes the CPU 3012, a RAM 3014, a GPU 3016, and a display device 3018, which are mutually connected by a host controller 3010. The computer 3000 also includes input/output units such as a communication interface 3022, a hard disk drive 3024, a DVD-ROM drive 3026, and an IC card drive, which are connected to the host controller 3010 via an input/output controller 3020. The computer also includes legacy input/output units such as a ROM 3030 and a keyboard 3042, which are connected to the input/output controller 3020 through an input/output chip 3040.

The CPU 3012 operates according to programs stored in the ROM 3030 and the RAM 3014, thereby controlling each unit. The GPU 3016 acquires image data generated by the CPU 3012 in a frame buffer or the like provided in the RAM 3014 or in itself, so that the image data is displayed on the display device 3018.

The communication interface 3022 communicates with other electronic devices via a network. The hard disk drive 3024 stores the program and data to be used by the CPU 3012 in the computer 3000. The DVD-ROM drive 3026 reads a program or data from the DVD-ROM 3001, and provides the program or data to the hard disk drive 3024 via the RAM 3014. The IC card drive reads the program and data from an IC card, and/or writes the program and data to the IC card.

The ROM 3030 stores therein a boot program or the like that is executed by the computer 3000 at the time of activation, and/or a program depending on the hardware of the computer 3000. The input/output chip 3040 may also connect various input/output units to the input/output controller 3020 via a parallel port, a serial port, a keyboard port, a mouse port, or the like.

A program is provided by a computer-readable storage medium, such as the DVD-ROM 3001 or the IC card. The program is read from the computer-readable storage medium, installed into the hard disk drive 3024, RAM 3014, or ROM 3030, which are also examples of the computer-readable storage medium, and executed by the CPU 3012. The information processing written in these programs is read into the computer 3000, resulting in cooperation between a program and the above various types of hardware resources. An apparatus or method may be configured by implementing an operation or processing of information in accordance with the use of the computer 3000.

For example, when communication is performed between the computer 3000 and an external device, the CPU 3012 may execute a communication program loaded in the RAM 3014 and instruct the communication interface 3022 to perform communication processing based on processing written in the communication program. Under the control of the CPU 3012, the communication interface 3022 reads transmission data stored in a transmission buffer area provided in a recording medium such as the RAM 3014, the hard disk drive 3024, the DVD-ROM 3001, or the IC card, and transmits the read transmission data to the network, or writes reception data received from the network in a reception buffer area or the like provided on the recording medium.

In addition, the CPU 3012 may cause all or a necessary portion of a file or a database to be read into the RAM 3014, the file or the database having been stored in an external recording medium such as the hard disk drive 3024, the DVD-ROM drive 3026 (DVD-ROM 3001), the IC card, and the like, and execute various types of processing on the data on the RAM 3014. Next, the CPU 3012 may write back the processed data into an external recording medium.

Various types of information, such as various types of programs, data, tables, and databases, may be stored in the recording medium to undergo information processing. The CPU 3012 may execute, against the data read from the RAM 3014, various types of processing, including various types of operations designated by an instruction sequence of a program, which are described throughout this disclosure, information processing, a condition judgment, a conditional branch, an unconditional branch, information search/re-placement, and the like, and write back the result to the RAM 3014. In addition, the CPU 3012 may search for information in a file, a database, or the like, in the recording medium. For example, when a plurality of entries, each having an attribute value of a first attribute associated with an attribute value of a second attribute, are stored in the recording medium, the CPU 3012 may search for an entry whose attribute value of the first attribute matches a designated condition, from among said plurality of entries, and read the attribute value of the second attribute stored in said entry, thereby acquiring the attribute value of the second attribute associated with the first attribute satisfying the predetermined condition.

The above described program or software modules may be stored in the computer-readable storage medium on or near the computer 3000. In addition, a recording medium such as a hard disk or a RAM provided within a server system connected to a dedicated communication network or the Internet can be used as a computer-readable storage medium, to thereby provide the above program to the computer 3000 via the network.

While the present invention has been described by way of the embodiments, the technical scope of the present invention is not limited to the above embodiments. It is apparent to persons skilled in the art that various alterations or improvements can be made to the above embodiments. In addition, the matters described with regard to the particular embodiment can be applied to other embodiments with a range without causing technical contradictions. In addition, each constitutional element may have features similar to those of other constitutional elements which have the same name and have the different numerals. It is also apparent from the description of the claims that embodiments added with such alterations or improvements can be included in the technical scope of the present invention.

Note that the operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the operation flow is described by using phrases such as "first" or "next" in the scope of the claims, specification, or drawings, it does not necessarily mean that the process must be performed in this order.

EXPLANATION OF REFERENCES

12: power system, 14: communication network, 20: mobile battery, 22: mobile battery, 24: mobile battery, 26: mobile battery, 28: mobile battery, 30: electric motorcycle, 40: user, 42: communication terminal, 100: battery management system, 120: battery exchanger, 122: stocking unit, 124: slot, 126: communication unit, 128: communication interface, 140: management server, 212: power connector, 214: communication connector, 220: power storage, 230: controller, 240: sensing unit, 250: storage, 310: communication line, 312: uninterruptible power supply apparatus, 314: router, 320: housing, 330: mounted equipment, 332: sensing unit, 334: setting storage, 336: controller, 360: housing, 370: mounted equipment, 372: user interface, 374: user identifier, 376: controller, 510: holding member, 632: abnormality detector, 634: attachment/detachment controller, 636: charge/discharge controller, 638: command responder, 674: attachment/detachment slot determiner, 676: charge/discharge slot determiner, 678: command transmitter, 710: breaker, 712: power line, 714: AC/DC power supply, 716: distributor, 718: power line, 730: main control board, 732: communication hub, 734: communication line, 742: temperature regulator, 744: buzzer, 746: sensing unit, 748: maintenance door, 760: AC/DC charger, 762: power connector, 770: slot control board, 772: communication connector, 774: driver, 776: shutter, 778: locking unit, 782: temperature regulator, 784: state displayer, 786: sensing unit, 814: AC/DC power supply, 816: service outlet, 820: CPU board, 830: Ethernet interface, 842: NFC reader, 844: camera, 852: touch panel, 854: display, 856: speaker, 1020: stocking unit, 1022: stocking unit, 1024: stocking unit, 1026: stocking unit, 1028: stocking unit, 1040: stocking unit, 1042: stocking unit, 1044: stocking unit, 1046: stocking unit, 1048: stocking unit, 1512: utilization index determiner, 1514: storage, 1522: demand acquisitor, 1524: slot determiner, 3000: computer, 3001: DVD-ROM, 3010: host controller, 3012: CPU, 3014: RAM, 3016: GPU, 3018: display device, 3020: input/output controller, 3022: communication interface, 3024: hard disk drive, 3026: DVD-ROM drive, 3030: ROM, 3040: input/output chip, and 3042: keyboard.

What is claimed is:

1. A control method of a stocking apparatus, wherein
the stocking apparatus includes a plurality of housings formed separately and independently,
each of the plurality of housings includes a plurality of stockers, each of which stocks an item, and
the control method comprises:
acquiring a demand number which is a number of at least one item being the item to be received by the stocking apparatus from a utilizer of the stocking apparatus or a number of the at least one item being the item to be provided by the stocking apparatus to the utilizer of the stocking apparatus;
  determining a receiving-and-providing stocker which is at least one of the plurality of stockers of the plurality of housings; and
  controlling operation of the receiving-and-providing stocker to receive the item from the utilizer or provide the item to the utilizer, based on the demand number;
  wherein
the determining the receiving-and-providing stocker comprises:
when the demand number is two, prohibiting determining, as the receiving-and-providing stockers, two of the plurality of stockers consisting of one of the plurality of stockers arranged in one of the plurality of housings and another one of the plurality of stockers arranged in another one of the housings not adjacent to the one of the plurality of housings.

2. The control method according to claim 1, wherein
the determining the receiving-and-providing stocker comprises:
when the demand number is two or more, determining the receiving-and-providing stockers such that (i) the receiving-and-providing stockers includes two of the plurality of stockers arranged in a single one of the plurality of housings, or (ii) the receiving-and-providing stockers includes two of the plurality of stockers consisting of one that is of the plurality of stockers and arranged in one of the plurality of housings and another one that is of the plurality of stockers and arranged in another one of the plurality of housings adjacent to the one of the plurality of housings.

3. A control method of a stocking apparatus, wherein the stocking apparatus includes a plurality of housings formed separately and independently, each of the plurality of housings includes a plurality of stockers, each of which stocks an item, and the control method comprises:

acquiring a demand number which is a number of at least one item being the item to be received by the stocking apparatus from a utilizer of the stocking apparatus or a number of the at least one item being the item to be provided by the stocking apparatus to the utilizer of the stocking apparatus;

determining a receiving-and-providing stocker which is at least one of the plurality of stockers of the plurality of housings; and controlling operation of the receiving-and-providing stocker to receive the item from the utilizer or provide the item to the utilizer, based on the demand number;

wherein the determining the receiving-and-providing stocker comprises:

when the demand number is two or more, if two or more of the plurality of stockers arranged in adjacent two of the plurality of housings are available, determining the two or more of the plurality of stockers as the receiving-and-providing stockers.

4. A control method of a stocking apparatus, wherein the stocking apparatus includes a plurality of housings formed separately and independently, each of the plurality of housings includes a plurality of stockers, each of which stocks an item, and the control method comprises:

acquiring a demand number which is a number of at least one item being the item to be received by the stocking apparatus from a utilizer of the stocking apparatus or a number of the at least one item being the item to be provided by the stocking apparatus to the utilizer of the stocking apparatus;

determining a receiving-and-providing stocker which is at least one of the plurality of stockers of the plurality of housings; and controlling operation of the receiving-and-providing stocker to receive the item from the utilizer or provide the item to the utilizer, based on the demand number;

wherein the stocking apparatus further includes a housing for control that is formed separately and independently from the plurality of housings and that includes a control apparatus which implements the control method, and the determining the receiving-and-providing stocker comprises:

when the demand number is two or more, determining the receiving-and-providing stockers such that the receiving-and-providing stockers do not include two of the plurality of stockers consisting of one of the plurality of stockers arranged in one of the plurality of housings and another one of the plurality of stockers arranged in another one of the plurality of housings having a distance from the one of the plurality of housings greater than a distance between the one of the plurality of housings and the housing for control.

5. A control method of a stocking apparatus, wherein the stocking apparatus includes a plurality of housings formed separately and independently, each of the plurality of housings includes a plurality of stockers, each of which stocks an item, and the control method comprises:

acquiring a demand number which is a number of at least one item being the item to be received by the stocking apparatus from a utilizer of the stocking apparatus or a number of the at least one item being the item to be provided by the stocking apparatus to the utilizer of the stocking apparatus;

determining a receiving-and-providing stocker which is at least one of the plurality of stockers of the plurality of housings; and controlling operation of the receiving-and-providing stocker to receive the item from the utilizer or provide the item to the utilizer, based on the demand number;

wherein the determining the receiving-and-providing stocker comprises:

determining the receiving-and-providing stocker for the utilizer among the plurality of stockers other than at least one of the plurality of stockers that has been determined as the receiving-and-providing stocker for another utilizer who utilized the stocking apparatus before the utilizer, among the plurality of stockers of the plurality of housings.

6. The control method according to claim 5, wherein the determining the receiving-and-providing stocker comprises:

determining the receiving-and-providing stocker for the utilizer among the plurality of stockers arranged in at least one of the plurality of housings other than at least one of the plurality of housings including the at least one of the plurality of stockers that has been determined as the receiving-and-providing stocker for the another utilizer.

7. A control method of a stocking apparatus, wherein the stocking apparatus includes a plurality of housings formed separately and independently, each of the plurality of housings includes a plurality of stockers, each of which stocks an item, and the control method comprises:

acquiring a demand number which is a number of at least one item being the item to be received by the stocking apparatus from a utilizer of the stocking apparatus or a number of the at least one item being the item to be provided by the stocking apparatus to the utilizer of the stocking apparatus;

determining a receiving-and-providing stocker which is at least one of the plurality of stockers of the plurality of housings; and controlling operation of the receiving-and-providing stocker to receive the item from the utilizer or provide the item to the utilizer, based on the demand number;

wherein the determining the receiving-and-providing stocker comprises:

determining the receiving-and-providing stocker for the utilizer among the plurality of stockers other than at least one of the plurality of stockers that has been determined as the receiving-and-providing stocker in a first period which is a period before a point in time when the utilizer utilizes the stocking apparatus and has a predetermined length, among the plurality of stockers of the plurality of housings.

8. The control method according to claim 7, wherein the determining the receiving-and-providing stocker comprises:

determining the receiving-and-providing stocker for the utilizer among the plurality of stockers arranged in at least one of the plurality of housings other than at least one of the plurality of housings including the at least one of the plurality of stockers that has been determined as the receiving-and-providing stocker in the first period.

9. A control method of a stocking apparatus, wherein the stocking apparatus includes a plurality of housings formed separately and independently, each of the plurality of housings includes a plurality of stockers, each of which stocks an item, and the control method comprises:

acquiring a demand number which is a number of at least one item being the item to be received by the stocking apparatus from a utilizer of the stocking apparatus or a number of the at least one item being the item to be provided by the stocking apparatus to the utilizer of the stocking apparatus;

determining a receiving-and-providing stocker which is at least one of the plurality of stockers of the plurality of housings; and controlling operation of the receiving-and-providing stocker to receive the item from the utilizer or provide the item to the utilizer, based on the demand number;

wherein the determining the receiving-and-providing stocker comprises:

acquiring a stocker determination degree of each of the plurality of stockers, wherein the stocker determination degree is a degree to which each of the plurality of stockers has been determined as the receiving-and-providing stocker before a point in time when the utilizer utilizes the stocking apparatus; and determining the receiving-and-providing stocker for the utilizer based on the stocker determination degree.

10. The control method according to claim 9, wherein the determining the receiving-and-providing stocker comprises:

acquiring a housing determination degree of each of the plurality of housings, wherein the housing determination degree is a degree to which the plurality of stockers arranged in each of the plurality of housings have been determined as the receiving-and-providing stocker before a point in time when the utilizer utilizes the stocking apparatus; and determining the receiving-and-providing stocker for the utilizer based on the housing determination degree.

11. The control method according to claim 10, wherein the determining the receiving-and-providing stocker comprises:

determining the receiving-and-providing stocker for the utilizer on a first basis where at least one of the plurality of stockers of at least one of the plurality of housings having the housing determination degree being larger is more likely to be determined as the receiving-and-providing stocker than at least one of the plurality of stockers of at least one of the plurality of housings having the housing determination degree being smaller, among the plurality of stockers of the plurality of housings.

12. A control method of a stocking apparatus, wherein the stocking apparatus includes a plurality of housings formed separately and independently, each of the plurality of housings includes a plurality of stockers, each of which stocks an item, and the control method comprises:

acquiring a demand number which is a number of at least one item being the item to be received by the stocking apparatus from a utilizer of the stocking apparatus or a number of the at least one item being the item to be provided by the stocking apparatus to the utilizer of the stocking apparatus;

determining a receiving-and-providing stocker which is at least one of the plurality of stockers of the plurality of housings;

controlling operation of the receiving-and-providing stocker to receive the item from the utilizer or provide the item to the utilizer, based on the demand number;

wherein the item is a power storage apparatus having a first terminal which is an electrical terminal, each of the plurality of stocker includes a power transferor having a second terminal which is an electrical terminal electrically connected to the first terminal, and the determining the receiving-and-providing stocker comprises:

acquiring a power transferor usage degree of each of the power transferors of the plurality of stockers, wherein the power transferor usage degree is a degree to which each of the power transferors has been utilized before a point in time when the utilizer utilizes the stocking apparatus and/or a degree to which each of the power transferors is utilized at a point in time when the utilizer utilizes the stocking apparatus; and determining the receiving-and-providing stocker for the utilizer based on the power transferor usage degree, wherein the determining the receiving-and-providing stocker comprises:

acquiring a housing power transferor usage degree of each of the plurality of housings, wherein the housing power transferor usage degree is a degree to which the power transferors arranged in each of the plurality of housings have been utilized before a point in time when the utilizer utilizes the stocking apparatus and/or a degree to which the power transferors arranged in each of the plurality of housings are utilized at a point in time when the utilizer utilizes the stocking apparatus; and determining the receiving-and-providing stocker for the utilizer based on the housing power transferor usage degree, wherein the determining the receiving-and-providing stocker comprises:

determining the receiving-and-providing stocker for the utilizer on a second basis where at least one of the plurality of stockers of at least one of the plurality of housings having the housing power transferor usage degree being larger is more likely to be determined as the receiving-and-providing stocker than at least one of the plurality of stockers of at least one of the plurality of housings having the housing power transferor usage degree being smaller, among the plurality of stockers of the plurality of housings.

13. The control method according to claim 1, wherein the determining the receiving-and-providing stocker comprises:

acquiring a stocker temperature which is a temperature of each of the plurality of stockers or a temperature of each of the items stocked by each of the plurality of stockers; and determining the receiving-and-providing stocker for the utilizer based on the stocker temperature.

14. The control method according to claim 1, wherein the determining the receiving-and-providing stocker comprises:

acquiring a housing internal temperature which is an internal temperature of each of the plurality of housings; and determining the receiving-and-providing stocker for the utilizer based on the housing internal temperature.

15. A computer-readable storage medium storing a program for causing a computer to implement a control method of a stocking apparatus, wherein the stocking apparatus includes a plurality of housings formed separately and independently, each of the plurality of housings includes a plurality of stockers, each of which stocks an item, and the control method comprises:

acquiring a demand number which is a number of at least one item being the item to be received by the stocking apparatus from a utilizer of the stocking apparatus or a number of at least one item being the item to be provided by the stocking apparatus to the utilizer of the stocking apparatus;

determining a receiving-and-providing stocker which is at least one of the plurality of stockers of the plurality of housings; and controlling operation of the receiving-and-providing stocker to receive the item from the utilizer or provide the item to the utilizer, based on the demand number;

wherein the determining the receiving-and-providing stocker comprises:

when the demand number is two, prohibiting determining, as the receiving-and-providing stockers, two of the plurality of stockers consisting of one of the plurality of stockers arranged in one of the plurality of housings and another one of the plurality of stockers arranged in another one of the housings not adjacent to the one of the plurality of housings.

16. An information processing apparatus that processes information for controlling a stocking apparatus, wherein the stocking apparatus includes a plurality of housings formed separately and independently, each of the plurality of housings includes a plurality of stockers, each of which stocks an item, and the information processing apparatus comprises:

an acquisitor which acquires a demand number which is a number of at least one item being the item to be received by the stocking apparatus from a utilizer of the stocking apparatus or a number of at least one item being the item to be provided by the stocking apparatus to the utilizer of the stocking apparatus;

a determiner which determines a receiving-and-providing stocker which is at least one of the plurality of stockers of the plurality of housings; and a controller which controls operation of the receiving-and-providing stocker to receive the item from the utilizer or provide the item to the utilizer, based on the demand number acquired by the acquisitor;

wherein the determiner is configured to:

when the demand number is two, prohibit determining, as the receiving-and-providing stockers, two of the plurality of stockers consisting of one of the plurality of stockers arranged in one of the plurality of housings and another one of the plurality of stockers arranged in another one of the housings not adjacent to the one of the plurality of housings.

* * * * *